(12) United States Patent
Toiyama

(10) Patent No.: US 9,576,402 B2
(45) Date of Patent: Feb. 21, 2017

(54) IMAGE PROCESSING DEVICE AND IMAGE PROCESSING METHOD

(75) Inventor: Keiichi Toiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 395 days.

(21) Appl. No.: 14/355,022

(22) PCT Filed: Mar. 27, 2012

(86) PCT No.: PCT/JP2012/002098
§ 371 (c)(1),
(2), (4) Date: Apr. 29, 2014

(87) PCT Pub. No.: WO2013/069171
PCT Pub. Date: May 16, 2013

(65) Prior Publication Data
US 2014/0306951 A1    Oct. 16, 2014

(30) Foreign Application Priority Data

Nov. 8, 2011   (JP) .................................. 2011-244225

(51) Int. Cl.
*G06T 15/00* (2011.01)
*G06T 19/20* (2011.01)
(Continued)

(52) U.S. Cl.
CPC ............... *G06T 19/20* (2013.01); *G01B 11/25* (2013.01); *G01B 11/2545* (2013.01);
(Continued)

(58) Field of Classification Search
CPC ..... G01B 11/25; G01B 11/2545; G03B 35/00; G06T 19/20; G06T 5/005; H04N 13/0239; H04N 13/0253
(Continued)

(56) References Cited

U.S. PATENT DOCUMENTS 6,903,746 B2 * 6/2005 Fukushima ............. G06T 15/04
    345/426
7,084,887 B1 * 8/2006 Sato ........................ A63F 13/10
    345/633

(Continued)

FOREIGN PATENT DOCUMENTS

JP    63-28193    2/1988
JP    2010-33367    2/2010

OTHER PUBLICATIONS

International Search Report issued Jun. 12, 2012 in International Application No. PCT/JP2012/002098.

*Primary Examiner* — Phu K Nguyen
(74) *Attorney, Agent, or Firm* — Wenderoth, Lind & Ponack, L.L.P.

(57) ABSTRACT

An image processing device which compensates for a stereoscopic effect of a stereoscopic image, the image processing device including: an obtaining unit which obtains a left-eye image and a right-eye image which are included in the stereoscopic image; a recognition image generating unit which generates a recognition image corresponding to the stereoscopic image by applying a pattern to a virtual stereoscopic structure generated based on a depth represented in the stereoscopic image; a right/left recognition image generating unit which generates, from the recognition image, a right-eye recognition image and a left-eye recognition image according to a disparity of the stereoscopic image for stereoscopically viewing the recognition image; and an image combining unit which combines the right-eye recognition image with the right-eye image obtained by the obtaining unit and combines the left-eye recognition image with the left-eye image obtained by the obtaining unit.

12 Claims, 39 Drawing Sheets

(51) Int. Cl.
  *H04N 13/02*    (2006.01)
  *G01B 11/25*    (2006.01)
  *G06T 5/00*     (2006.01)
  *G03B 35/00*    (2006.01)

(52) U.S. Cl.
  CPC ......... *G06T 5/005* (2013.01); *H04N 13/0239* (2013.01); *H04N 13/0253* (2013.01); *G03B 35/00* (2013.01)

(58) Field of Classification Search
  USPC ............................... 345/419, 426, 473, 633
  See application file for complete search history.

(56) References Cited

U.S. PATENT DOCUMENTS

| | | | | |
|---|---|---|---|---|
| 7,312,795 B2* | 12/2007 | Aso | ....................... | G06T 7/0042 345/419 |
| 7,542,033 B2* | 6/2009 | Kawakami | .............. | G06T 15/02 345/419 |
| 8,072,470 B2* | 12/2011 | Marks | ..................... | A63F 13/10 345/473 |
| 9,014,414 B2* | 4/2015 | Katano | .................. | G06T 19/00 345/419 |
| 9,282,313 B2* | 3/2016 | Zhou | .................... | H04N 13/026 |
| 2010/0027888 A1 | 2/2010 | Katano et al. | | |
| 2013/0286010 A1* | 10/2013 | Yan | .................... | H04N 13/0022 345/419 |

\* cited by examiner

IMAGE PROCESSING DEVICE AND IMAGE PROCESSING METHOD

TECHNICAL FIELD

The present invention relates to image processing devices and image processing methods. More particularly, the present invention relates to an image processing device and an image processing method that allow compensation for a stereoscopic effect of an image that has lost the stereoscopic effect.

BACKGROUND ART

A stereoscopic image display device has been known conventionally, which presents different images having a disparity therebetween to a right eye and a left eye of a viewer to allow the viewer to view the images stereoscopically (for example, see Patent Literature (PTL) 1).

FIG. 39 illustrates a perspective view of a configuration of a conventional stereoscopic image display device.

An image receiving tube 2601 is a shadow mask color cathode ray tube (CRT). A polarization plate 2602 has two kinds of segments disposed alternately in stripes in a lateral direction and the polarizing directions of the two segments are perpendicular to each other. The polarization plate 2602 is attached to the screen of the image receiving tube 2601. It should be noted that FIG. 39 illustrates the polarization plate 2602 separately from the image receiving tube 2601.

FIG. 40 is an enlarged partially cut-out view that schematically illustrates a screen portion of the image receiving tube 2601.

An image receiving tube 2701 is a detailed illustration of the image receiving tube 2601 in FIG. 39. A polarization plate 2702 is a detailed illustration of the polarization plate 2602 in FIG. 39.

An electron beam 2705 passes through a shadow mask 2703 and collides with a fluorescent substance 2704 applied on the image receiving tube 2601 to illumine the fluorescent substance 2704. The light from the fluorescent substance 2704 passes through the polarization plate 2702 and is emitted as a polarized light.

The polarization plate 2702 is segmented into A segments which transmit only vertically (V) polarized waves and B segments which transmit only horizontally (H) polarized waves as illustrated in FIG. 40. For example, it is assumed that an image to be seen by a right eye corresponds to the V polarized waves, and an image to be seen by a left eye corresponds to the H polarized waves. In other words, a polarization filter which transmits the V polarized waves is provided on the right eye of glasses for viewing the screen of the image receiving tube 2701, and a polarization filter which transmits the H polarized waves is provided on the left eye of the glasses.

A stereoscopic image is captured using stereo cameras each having an image capturing unit which corresponds to a left eye or a right eye. When the stereoscopic image is reproduced on the image receiving tube 2701, image signals are switched to project the image of the stereo camera corresponding to the right eye (right-eye image) on the A segments, and project the image of the stereo camera corresponding to the left eye (left-eye image) on the B segments.

FIG. 41 illustrates an example of the right-eye and left-eye images that are captured by two stereo cameras.

A left-eye image 2801 is an image of the stereo camera at a position corresponding to the left eye, and a right-eye image 2802 is an image of the stereo camera at a position corresponding to the right eye. The left-eye image 2801 and the right-eye image 2802 shown in FIG. 41 have a disparity.

FIG. 42 is a diagram showing FIG. 41 with scales.

A scale 2903 is for the left-eye image 2801 and graduated from 1 to 21. A scale 2904 is for the right-eye image 2802 and graduated from 1 to 21 as with the scale 2903.

In FIG. 42, the number 4 on the scale of the left-eye image 2801 corresponds to the number 5 on the scale of a right-eye image 2802. Similarly, the number 16 on the scale of the left-eye image 2801 corresponds to the number 17 on the scale of the right-eye image 2802. In other words, the right-eye image 2802 and the left-eye image 2801 have a disparity in a horizontal direction. A viewer can view the images stereoscopically by viewing the right-eye image 2802 with the right eye and the left-eye image 2801 with the left eye.

CITATION LIST

Patent Literature

[PTL 1] Japanese Unexamined Patent Application Publication No. 63-28193

SUMMARY OF INVENTION

As described above, a disparity between the right and left images is necessary for a viewer to see the images stereoscopically. However, for example, when details of a specific region in an image have been lost, the stereoscopic effect of the specific region in the image is lost.

In view of the above, an object of the present invention is to provide an image processing device capable of compensating for a stereoscopic effect of a region that has lost details in a stereoscopic image.

In order to solve the above problems, an image processing device according to an aspect of the present invention is an image processing device which compensates for a stereoscopic effect of a stereoscopic image, the image processing device including: an obtaining unit which obtains a left-eye image and a right-eye image which are included in the stereoscopic image; a recognition image generating unit which generates a recognition image corresponding to the stereoscopic image by applying a pattern to a virtual stereoscopic structure which is generated based on a depth represented in the stereoscopic image; a right/left recognition image generating unit which generates, from the recognition image, a right-eye recognition image and a left-eye recognition image according to a disparity in the stereoscopic image, the right-eye and left-eye recognition images allowing the recognition image to be viewed stereoscopically; and an image combining unit which combines the right-eye recognition image with the right-eye image obtained by the obtaining unit and combines the left-eye recognition image with the left-eye image obtained by the obtaining unit.

These general or specific aspects may be implemented using a system, a method, an integrated circuit, a computer program, or a computer-readable recording medium, or any combination of systems, methods, integrated circuits, computer programs, and computer-readable recording media.

According to the present invention, a stereoscopic effect of a region which has lost details in a stereoscopic image can be compensated by combining a recognition image with each of the left-eye image and the right-eye image that are included in the stereoscopic image.

DESCRIPTION OF EMBODIMENTS

Underlying Knowledge Forming Basis of the Present Invention

As described in Background Art, a disparity between a left image and a right image is necessary for a viewer to view the images stereoscopically. The inventor of the present invention has found a problem that when details of a specific region in an image have been lost for example, the stereoscopic effect of the specific region of the image is lost.

Figure 1:
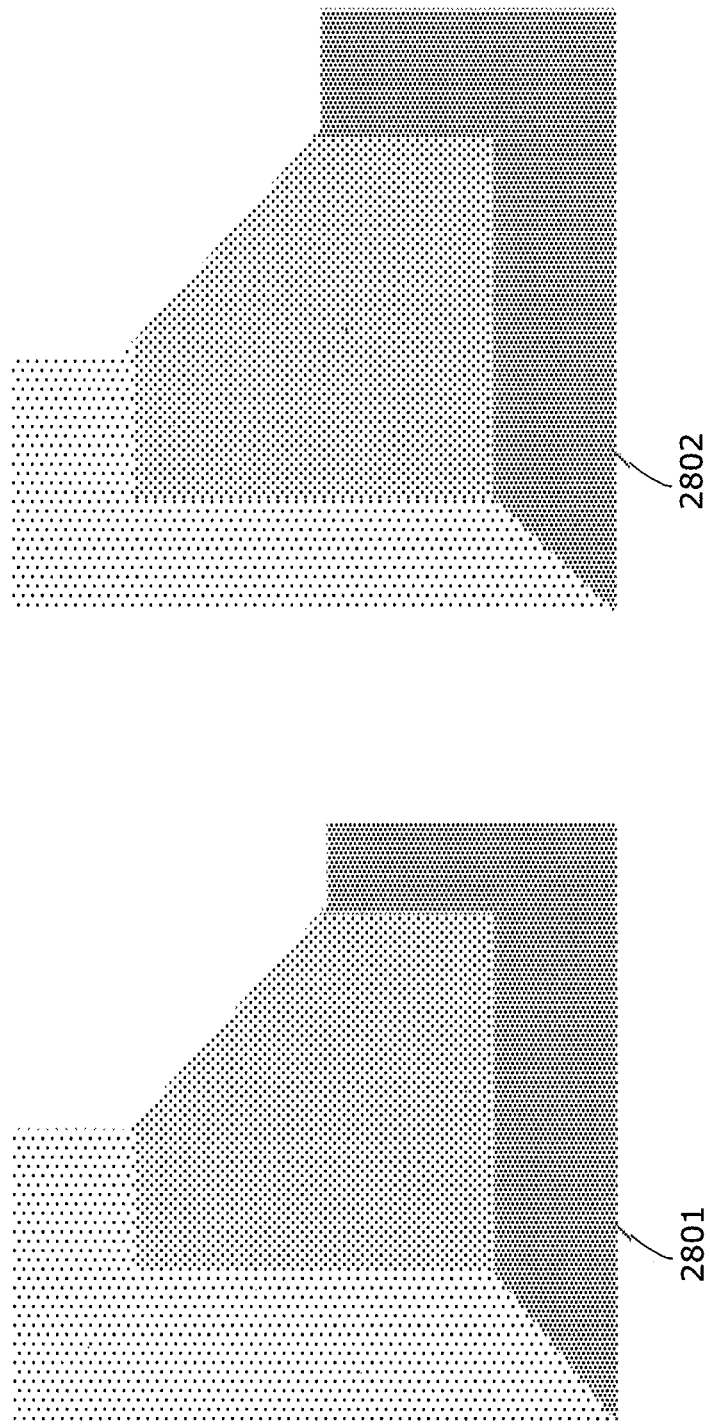
FIG. 1 illustrates an example of images with flared highlights due to the upper-right portions of the images being exposed to bright light.
Figure 41:
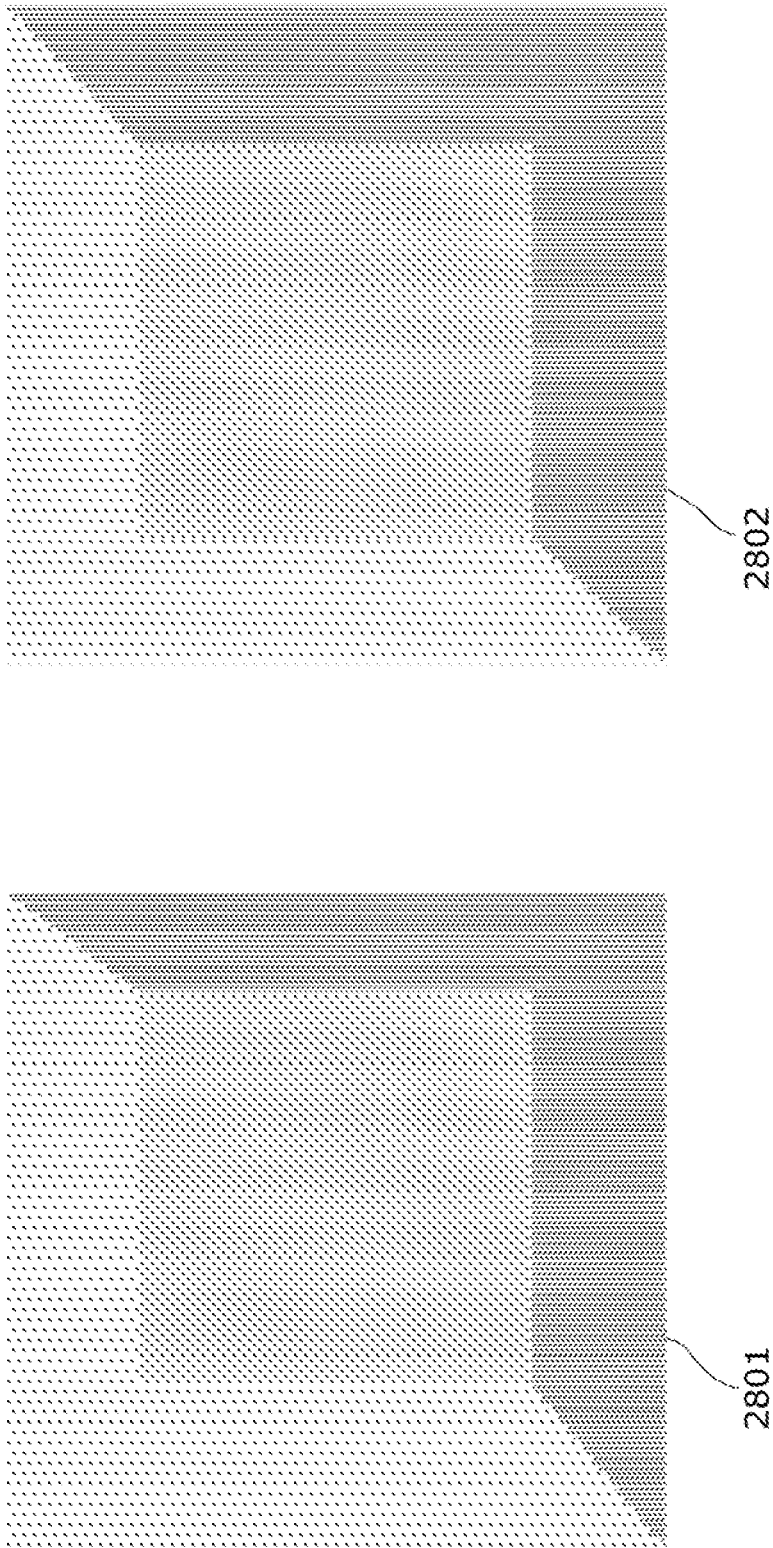
FIG. 41 illustrates an example of the right-eye image and the left-eye image that are captured by two stereo cameras.
Figure 42:
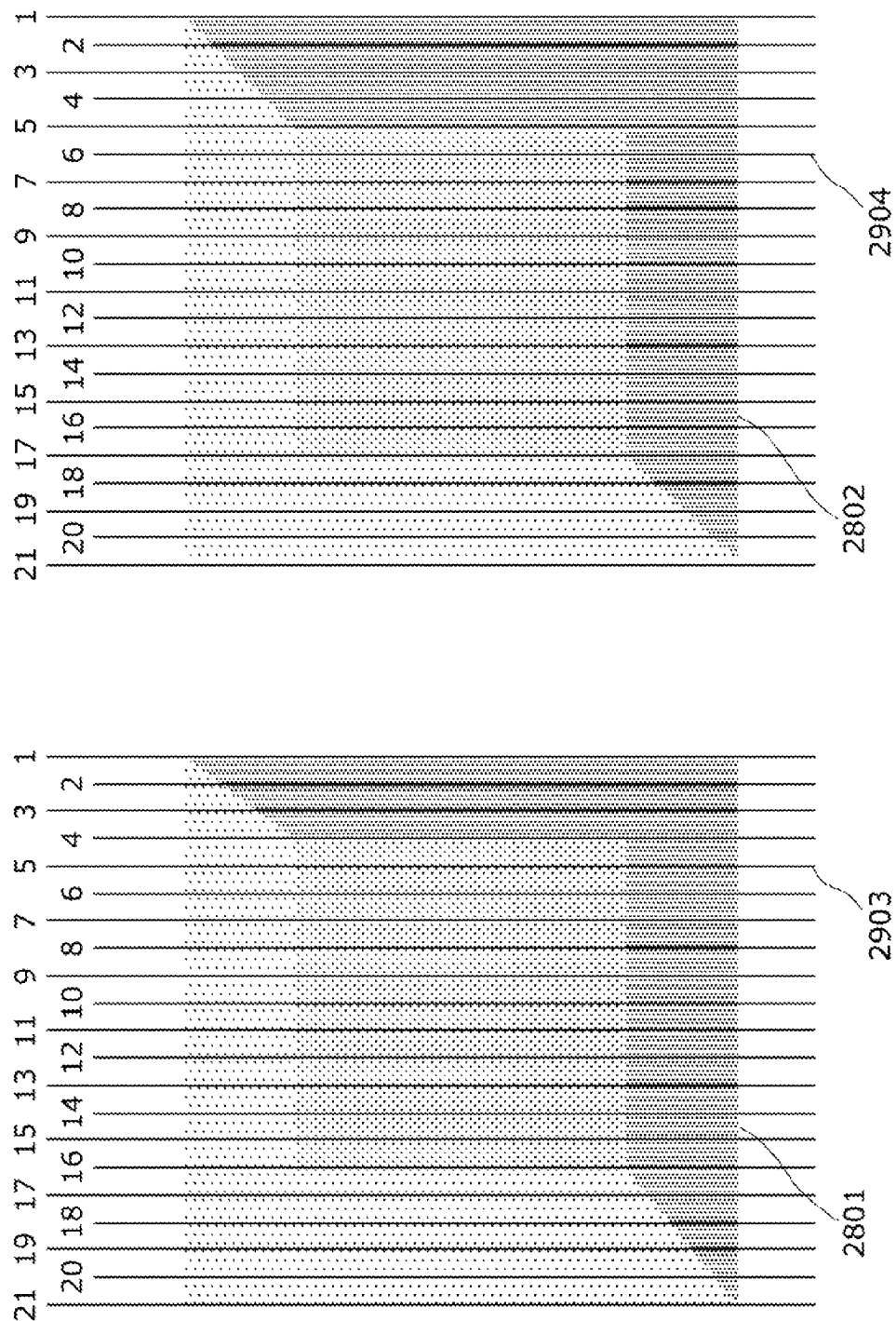
FIG. 42 is a diagram showing FIG. 41 with scales.

FIG. 1 illustrates an example of images with flared highlights due to the upper-right portions of the example images in FIG. 41 being exposed to bright light.

As illustrated in FIG. 1, in the flared highlights phenomenon in which specific regions in the images are uniformly white because a subject is exposed to bright light for example, details in the specific regions are lost. Therefore, the stereoscopic effect is lost in the stereoscopic image obtained from the images illustrated in FIG. 1.

A similar problem occurs in a blocked-up shadows phenomenon in which a specific region in an image becomes uniformly black because a subject included in the image is underexposed.

This is because a specific region loses details of an image in the flared highlights and the blocked-up shadows phenomena, and the left-eye image and the right-eye image become substantially the same and there is little disparity between the left-eye image and the right-eye image.

It should be noted that the loss of the stereoscopic effect does not only occur due to the flared highlights and the like. The stereoscopic effect of a stereoscopic image may be lost by image expression done by a creator in creating a work such as a movie film or the like.

For example, a process such as adjusting the tone, increasing or decreasing the contrast, pixelization or the like is deliberately added to the stereoscopic image, the region in the stereoscopic image having been processed with above processes may sometimes lose details.

Moreover, for example, a scene in a dark place is captured with an intentionally low contrast as a way of expression to create an image. The stereoscopic effect of such an image is more likely to be lost because of the reasons described above.

This is also applied to an image generated by a computer as typified by a game and a computer aided design (CAD) work. Such an image sometimes does not have a scratch or roughness on a surface of a subject in the image for simplifying the process or as a way of expression intended by a creator. Also in such cases, features of the subject in the right-eye image and the left-eye image are likely to exhibit little difference, and thus the stereoscopic effect is likely to be lost.

The ways of image expression described above are used to improve presence feelings or the like of a two-dimensional (2D) image, but if these expressions are directly applied to a stereoscopic image, the stereoscopic effect that is the greatest characteristic of a stereoscopic image may sometimes be lost.

Moreover, for a monitoring camera and an infrared camera, an image keeping low contrast and having an improved stereoscopic effect is useful. However, with the conventional techniques, an image with low contrast gives a poor stereoscopic effect.

In order to solve the above problems, an image processing device according to an aspect of the present invention is an image processing device which compensates for a stereoscopic effect of a stereoscopic image, the image processing device including: an obtaining unit which obtains a left-eye image and a right-eye image which are included in the stereoscopic image; a recognition image generating unit which generates a recognition image corresponding to the stereoscopic image by applying a pattern to a virtual stereoscopic structure which is generated based on a depth represented in the stereoscopic image; a right/left recognition image generating unit which generates, from the recognition image, a right-eye recognition image and a left-eye recognition image according to a disparity in the stereoscopic image, the right-eye and left-eye recognition images allowing the recognition image to be viewed stereoscopically; and an image combining unit which combines the right-eye recognition image with the right-eye image obtained by the obtaining unit and combines the left-eye recognition image with the left-eye image obtained by the obtaining unit.

With this, the stereoscopic effect of the original image can be compensated using the original image as it is.

Moreover, the image processing device may further include a detecting unit configured to detect, in the right-eye image and in the left-eye image, a target region in which the stereoscopic effect needs compensation, in which when the target region is detected, the image combining unit may combine the right-eye recognition image with the right-eye image and combine the left-eye recognition image with the left-eye image.

Moreover, when the detecting unit detects the target region, the image combining unit may combine a region in the right-eye recognition image with the target region in the right-eye image, and combine a region in the left-eye recognition image with the target region in the left-eye image, the region in each of the right-eye and left-eye recognition images correspond to the target region.

Moreover, the detecting unit may detect, in the right-eye image and the left-eye image, a region having a luminance value less than a predetermined threshold value or a region having a luminance value more than the predetermined threshold value as the target region.

Moreover, the detecting unit may detect, in the right-eye image and in the left-eye image, a region having a contrast value less than a predetermined value as the target region.

Accordingly, the compensation for the stereoscopic effect is possible with a minimum change in the atmosphere of the original image by providing the detecting unit to detect a region in which the stereoscopic effect needs compensation and combining the recognition image with the region.

Moreover, the pattern may be an irregular pattern.

Accordingly, generation of the recognition image using an irregular pattern enables the stereoscopic effect of the stereoscopic image to be adequately compensated for without being affected by individual differences between viewers.

Moreover, the pattern may be a regular pattern.

The regular pattern is easy to be generated and thus reduces a load of generating a recognition image.

Moreover, the image processing device may further include a viewpoint position obtaining unit which obtains viewpoint position information indicating a position at which each of the left-eye image and the right-eye image is captured, in which the right/left recognition image generating unit may generate the right-eye recognition image and the left-eye recognition image from the recognition image according to the disparity in the stereoscopic image based on the viewpoint position information.

Moreover, the viewpoint position information may include (i) focus position information indicating a focus position of an image capturing unit at the time that each of the left-eye image and the right-eye image is captured or (ii) aperture value information indicating an aperture value of the image capturing unit at the time that each of the left-eye image and the right-eye image is captured.

With this, the blur in the original right-eye image and the left-eye image can be added in the same manner to the right-eye recognition image and the left-eye recognition image, respectively. Therefore, the image processing device can compensate for a stereoscopic effect more naturally without changing the atmosphere of the original image.

Moreover, the image processing device may further include a depth information obtaining unit which obtains depth information indicating the depth in the stereoscopic image, in which the recognition image generating unit may generate the recognition image based on the depth information.

Moreover, the recognition image generating unit may calculate depth information indicating the depth in the stereoscopic image from the right-eye image and the left-eye image that are obtained by the obtaining unit, and generate the recognition image based on the depth information.

An image processing method according to an aspect of the present invention is an image processing method of compensating for a stereoscopic effect of a stereoscopic image, the image processing method including: obtaining a left-eye image and a right-eye image which are included in the stereoscopic image; generating a recognition image corresponding to the stereoscopic image by applying a pattern to a virtual stereoscopic structure that is generated based on a depth represented in the stereoscopic image; generating a left recognition image and a right recognition image from the recognition image according to a disparity in the stereoscopic image; and combining the right-eye recognition image with the right-eye image obtained in the obtaining and combining the left-eye recognition image with the left-eye image obtained in the obtaining.

In other words, the present invention may be realized as an image processing method.

These general and specific aspects may be implemented using a system, a method, an integrated circuit, a computer program, or a computer-readable recording medium, or any combination of systems, methods, integrated circuits, computer programs, or computer-readable recording media.

Hereinafter, the above-mentioned image processing device capable of compensating for a stereoscopic effect of a region which has lost details in the stereoscopic image is described, with reference to the accompanying drawings.

It should be noted that the embodiments described below are each merely an illustration of the present invention. Values, shapes, materials, components, disposition or a form of connection between the structural elements, steps, and the order of the steps are merely illustrative, and are not intended to limit the present invention. Moreover, among components of the below embodiments, structural elements not set forth in the independent claims indicating the most generic concept of the present invention will be described as optional structural elements.

Embodiment 1

Figure 2:
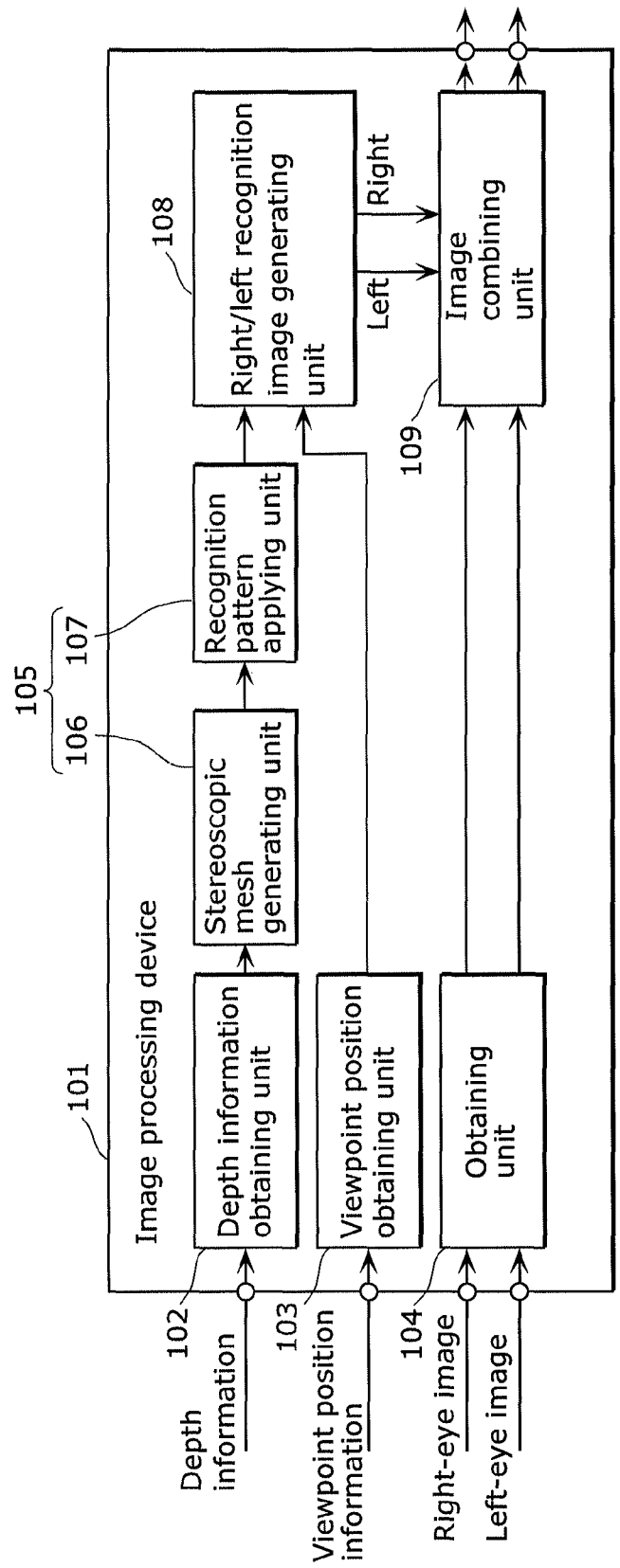
FIG. 2 is a block diagram of an image processing device according to Embodiment 1.

FIG. 2 is a block diagram of an image processing device according to Embodiment 1.

The image processing device 101 includes: an obtaining unit 104, a depth information obtaining unit 102, a viewpoint position obtaining unit 103, a recognition image generating unit 105, a right/left recognition image generating unit 108, and an image combining unit 109.

The recognition image generating unit 105 includes a stereoscopic mesh generating unit 106 and a recognition pattern applying unit 107.

The obtaining unit 104 obtains a right-eye image and a left-eye image which are included in a stereoscopic image, and outputs the images to the image combining unit. In this embodiment, the obtaining unit 104 obtains the left-eye image and the right-eye image by capturing the images with an image capturing unit that is not illustrated in the drawings. In other words, the image processing device 101 may be applied to a digital still camera (DSC) and the like.

It should be noted that the obtaining unit 104 may obtain images through a broadcast wave or a communication network. Types of the broadcast wave are not particularly limited. For example, the obtaining unit 104 obtains images through analog broadcasting, ground wave digital broadcasting, broadcast satellite (BS), or communication satellite (CS) broadcasting.

In other words, the image processing device 101 can be applied to a television receiver device and the like.

Moreover, the obtaining unit 104 may read out images from a recording medium. Types of the recording medium are not particularly limited. For example, the obtaining unit 104 obtains images from a digital versatile disc (DVD), a Blu-ray® disc (BD), a secure digital (SD) card, or the like.

In other words, the image processing device 101 may be applied to a Blu-ray® recorder and the like.

The right-eye image and the left-eye image to be obtained by the obtaining unit 104 are the right-eye image and the left-eye image that are included in the stereoscopic image in which the stereoscopic effect is to be compensated by the image processing device 101.

Figure 3:
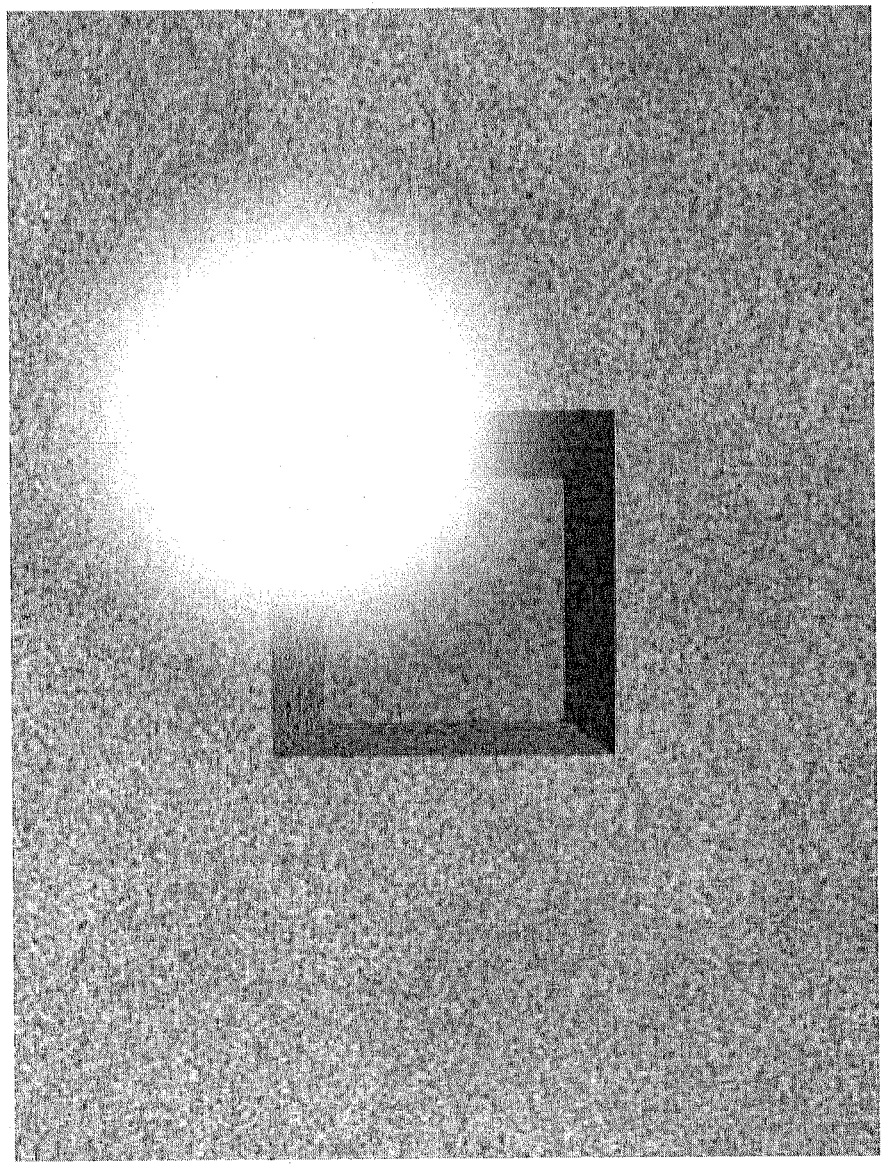
FIG. 3 illustrates a right-eye image according to Embodiment 1.
Figure 4:
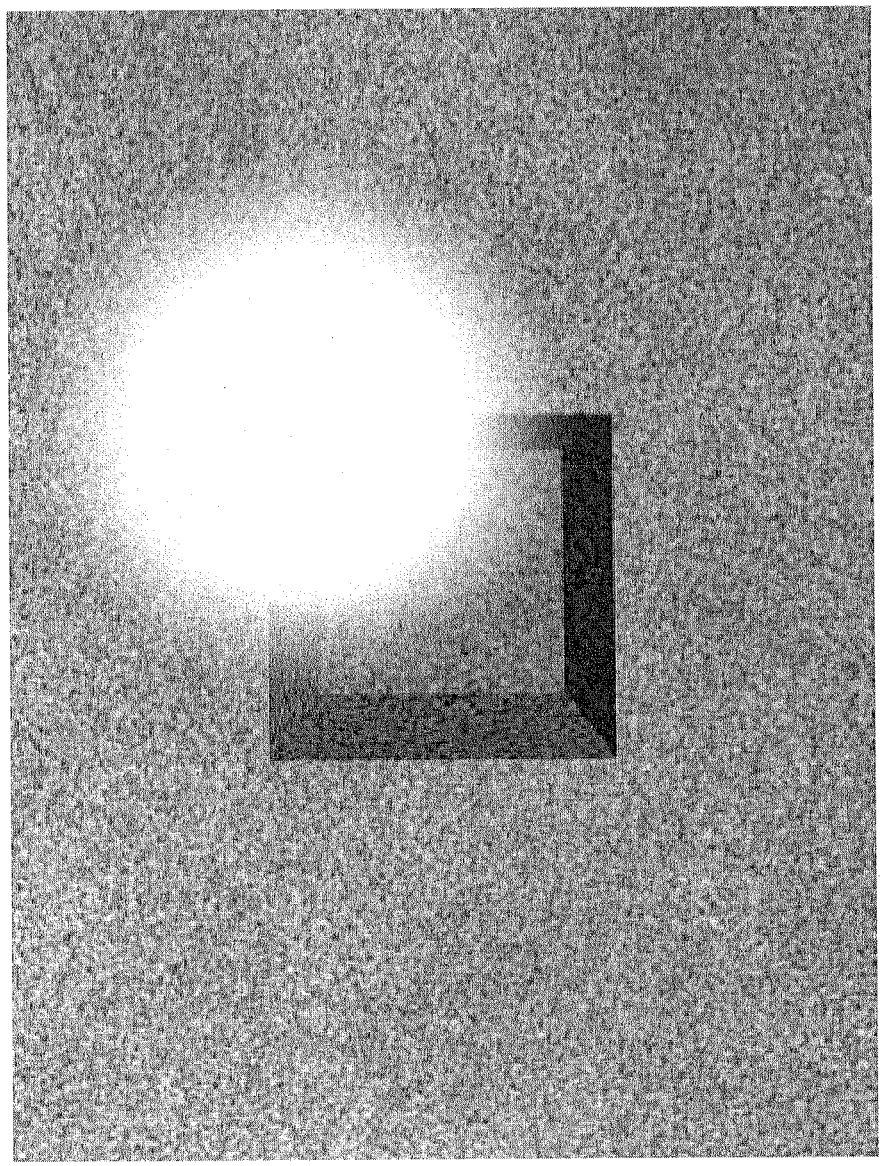
FIG. 4 illustrates a left-eye image according to Embodiment 1.

FIG. 3 illustrates a right-eye image according to Embodiment 1, and FIG. 4 illustrates a left-eye image according to Embodiment 1.

As illustrated in FIG. 3 and FIG. 4, the upper-right portions of the square truncated pyramids in the diagrams are flared highlights and the details are lost. This results in loss of the stereoscopic effect of the upper-right portion in the stereoscopic image which includes these two images (the right-eye image and the left-eye image), and the upper-right portion in the stereoscopic image looks like a hole.

Figure 5:
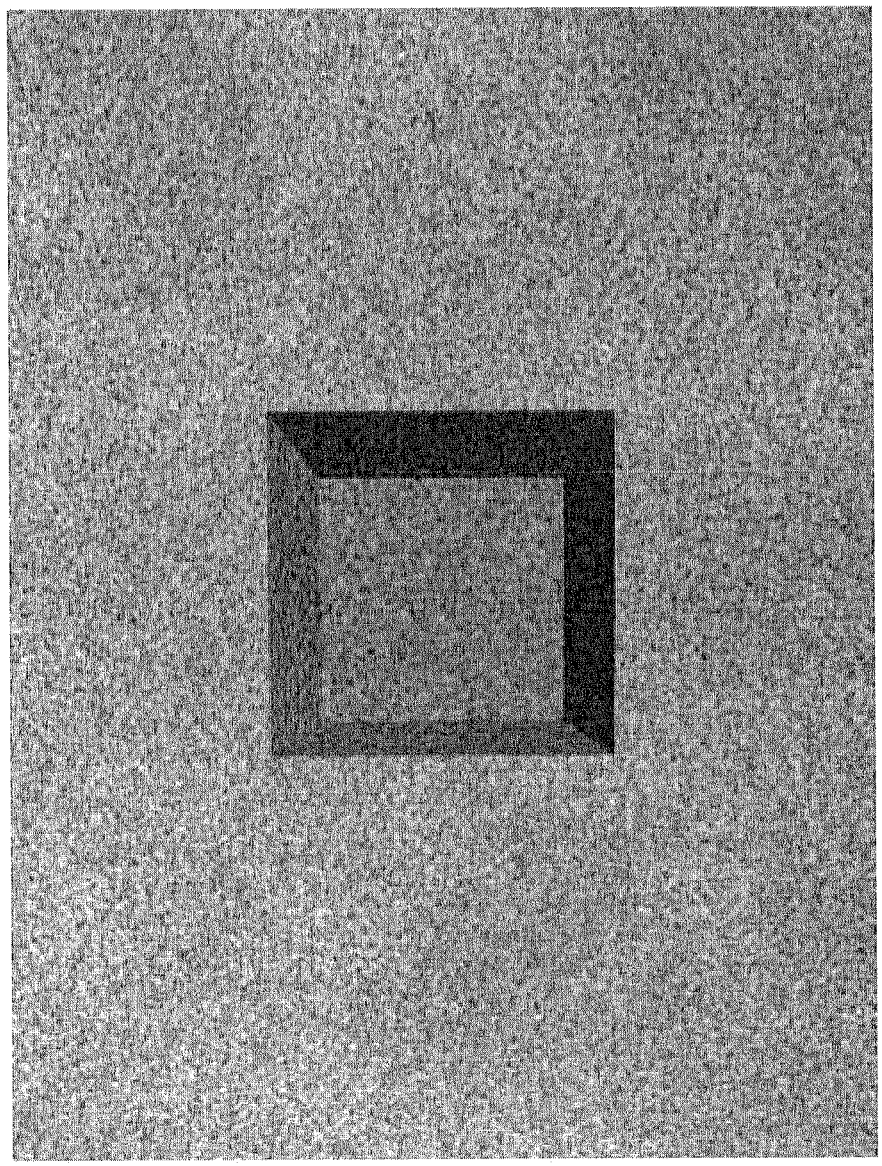
FIG. 5 illustrates a right-eye image without flared highlights.
Figure 6:
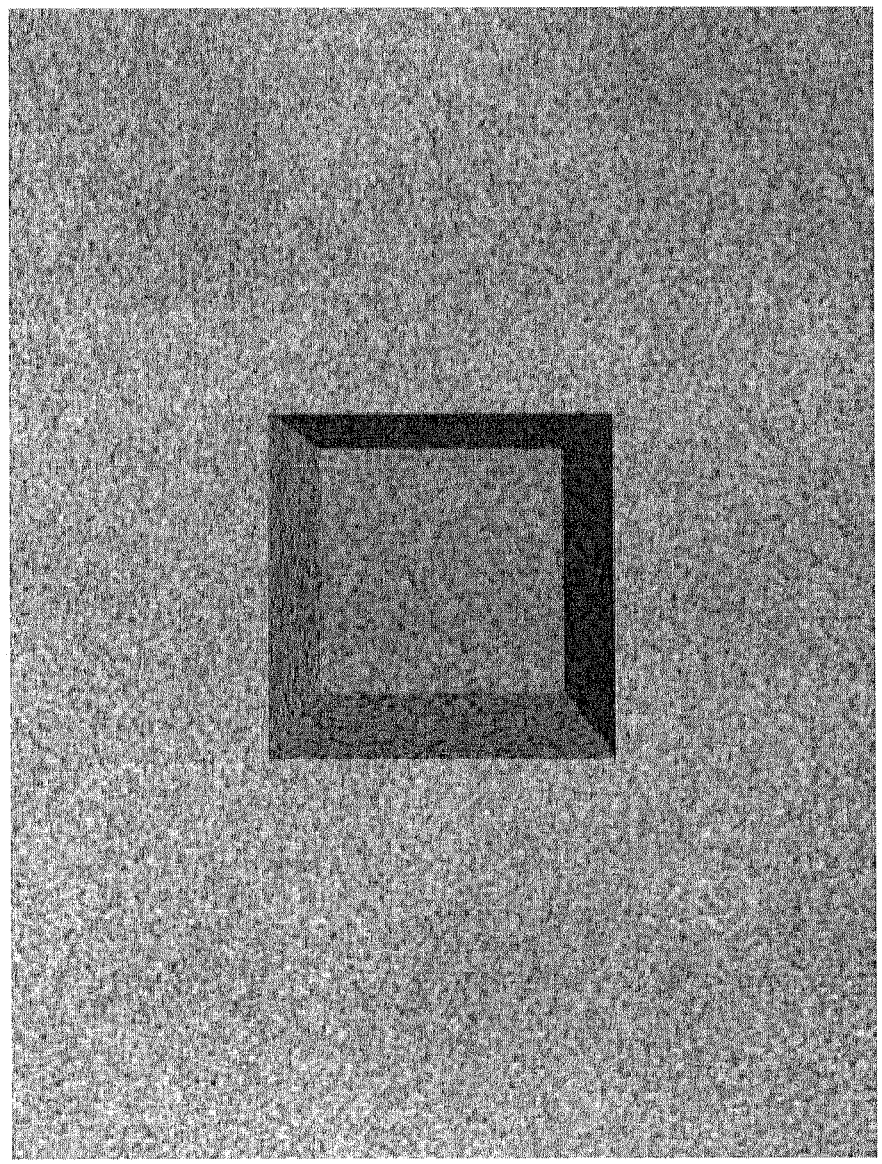
FIG. 6 illustrates a left-eye image without flared highlights.

FIG. 5 illustrates a right-eye image without flared highlights, and FIG. 6 illustrates a left-eye image without flared highlights.

It is an ideal that the shape of the square truncated pyramid can be clearly viewed stereoscopically as when FIGS. 5 and 6 are viewed stereoscopically. However, as illustrated in FIGS. 3 and 4, flared highlights often appear in the images due to reflection of a light source when the images are captured.

The depth information obtaining unit 102 obtains depth information indicating a depth of the stereoscopic image, and outputs the depth information to the stereoscopic mesh generating unit.

The depth information is one-dimensional information indicating a depth corresponding to each pixel included in the image.

Specifically, the depth information obtaining unit 102 emits ultrasonic waves on a subject and measures the arrival time of the reflected waves to obtain the depth information. Moreover, the depth information obtaining unit 102 may project an infrared grid on the subject and measure the location thereof to obtain the depth information. Moreover, the depth information obtaining unit 102 may obtain images from dedicated imaging devices disposed in a matrix with respect to the subject, and obtain the depth information of each image.

There are several ways to express the depth information. The depth information is simply stated as three-dimensional data including a data pair of two-dimensional coordinate data (positions of pixels) and one-dimensional depth data corresponding to the coordinate data.

Moreover, the depth information can be expressed more visually.

Figure 7:
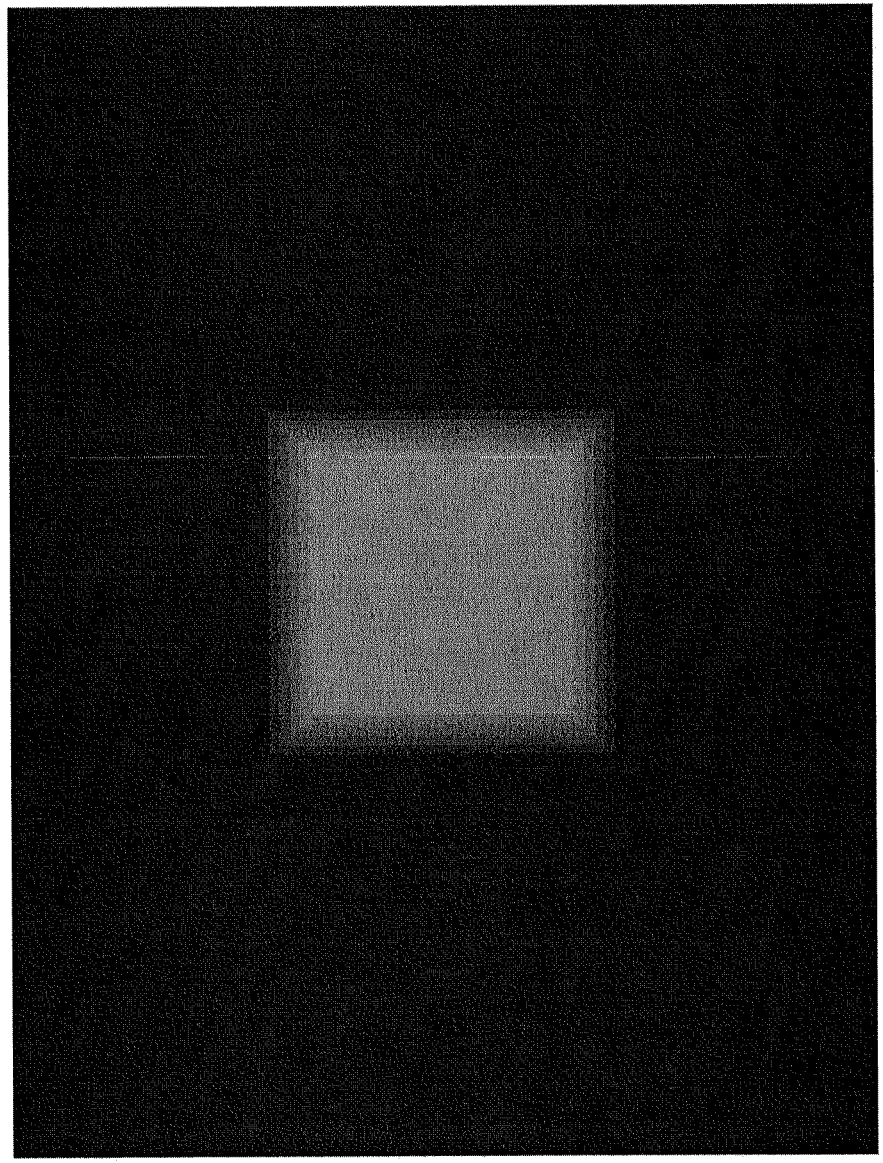
FIG. 7 illustrates an example of visually-expressed depth information.

FIG. 7 illustrates an example of visually-expressed depth information.

FIG. 7 is an example of expressing a depth of each pixel included in the image in grayscale.

In FIG. 7, the pixels corresponding to the subject located closer to the viewer of the image are shown in a brighter color, and the subject located farther from the viewer of the image is shown in a darker color. In other words, for example, the image including the depth information illustrated in FIG. 7 is assumed to be an image in which a square truncated pyramid placed on a plane is captured as a subject.

It should be noted that, in this embodiment, the depth information is measured by using, as a base point, a middle point of two viewpoint positions indicated by viewpoint position information, which will be described later.

The viewpoint position obtaining unit 103 obtains viewpoint position information indicating a position at which each of the left-eye and the right-eye images is captured, and outputs the information to the right/left recognition image generating unit.

The viewpoint position information indicates a viewpoint position at which each of the right-eye image and the left-eye image included in the stereoscopic image is captured.

In this embodiment, the viewpoint position information indicates that the distance between two imaging devices included in the image capturing unit is 50 mm, the focal length is 35 mm, and each of the two imaging devices faces inwardly by approximately 3.6 degrees.

The stereoscopic mesh generating unit 106 generates a stereoscopic mesh using the depth information input thereto, and outputs the stereoscopic mesh to the recognition pattern applying unit 107. The stereoscopic mesh is a virtual stereoscopic structure that is generated based on the depth represented in the stereoscopic image.

Figure 8:
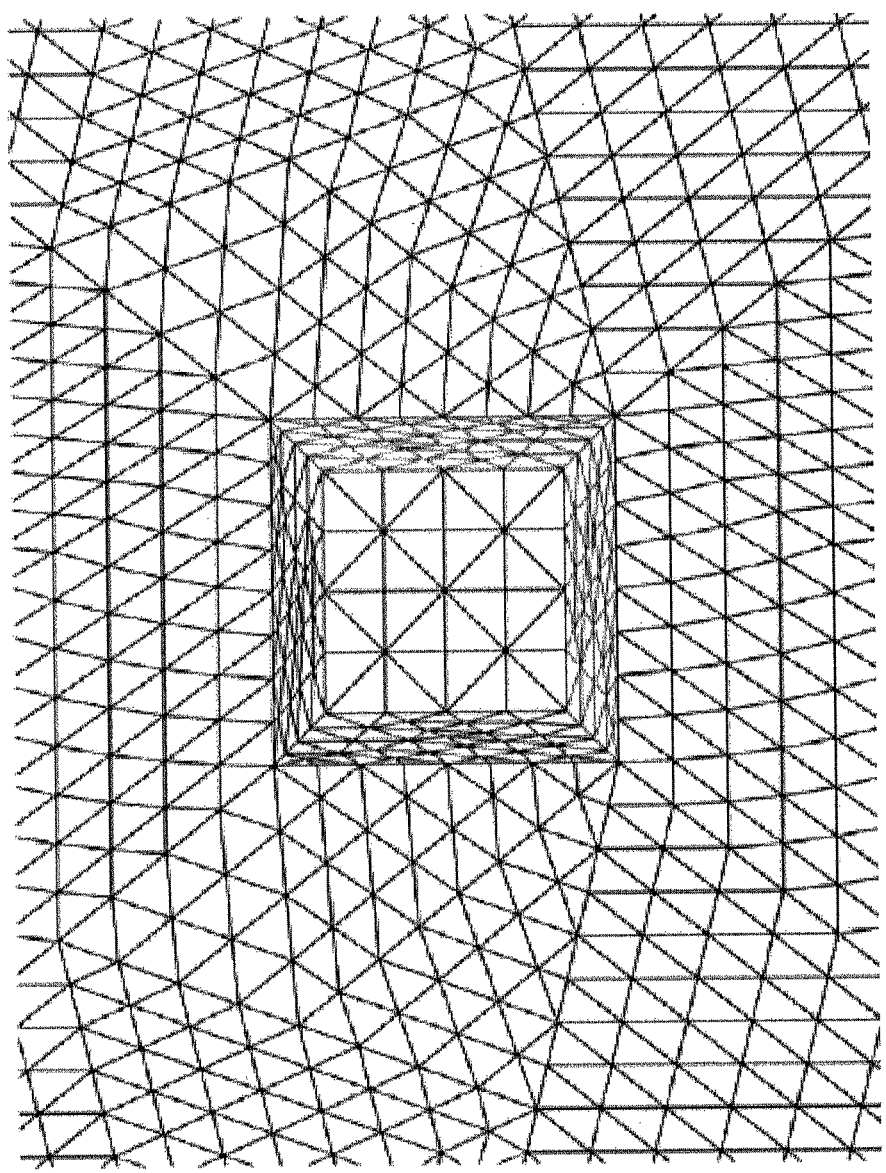
FIG. 8 is an example of a stereoscopic mesh generated by a stereoscopic mesh generating unit using the depth information.

FIG. 8 is an example of a stereoscopic mesh generated by the stereoscopic mesh generating unit using the depth information. That is, FIG. 8 is a diagram obtained by converting the depth information in FIG. 7 into a stereoscopic mesh.

As illustrated in FIG. 8, the stereoscopic mesh includes three-dimensional vertices positional data, line segments connecting the vertices, and planes defined by the line segments.

A method of generating a stereoscopic mesh from the depth information by the stereoscopic mesh generating unit 106 is described in more detail with reference to FIGS. 9 to 11.

Figure 9:
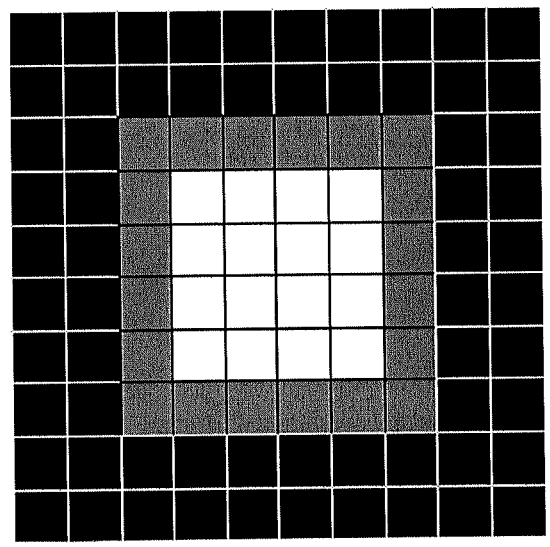
FIG. 9 shows the depth information with 10×10 pixels in grayscale.

FIG. 9 is a schematic view showing the depth information with 10×10 pixels in grayscale to simplify the descriptions.

In FIG. 9, a square represents one pixel, and the tone of each pixel corresponds to the depth as in FIG. 7. In other words, in FIG. 9, vertices are to be disposed closer to the viewer if the pixels are bright, and vertices are to be disposed farther from the viewer if the pixels are darker. That is to say, the image having the depth information as in FIG. 9 is implied to be an image in which a square truncated pyramid having a central square portion being higher than the rest is captured.

Figure 10:
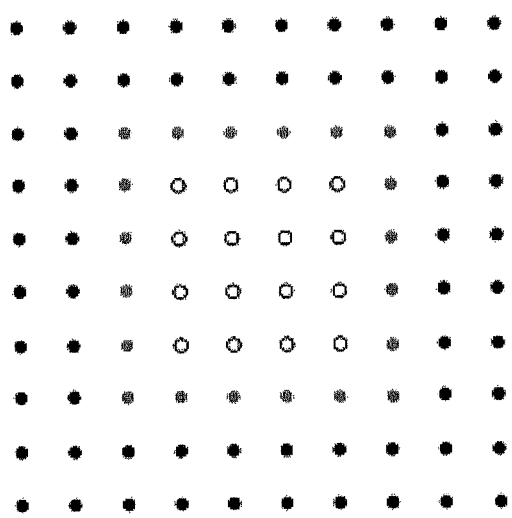
FIG. 10 illustrates each vertex when a center of each pixel in FIG. 9 is considered as a vertex.

FIG. 10 illustrates each vertex when a center of each pixel in FIG. 9 is considered as a vertex. To simplify the descriptions, each vertex is shown with the same tone as that of each pixel in FIG. 8.

The stereoscopic mesh generating unit 106 generates a stereoscopic mesh by translating the vertices in a depth direction (a vertical direction with respect to the image), based on the tone of each vertex, i.e., the depth information.

Figure 11:
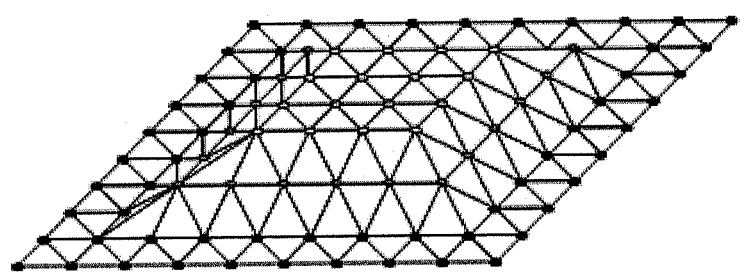
FIG. 11 is a perspective view of the stereoscopic mesh generated by the stereoscopic mesh generating unit.

FIG. 11 is a perspective view of the stereoscopic mesh generated by the stereoscopic mesh generating unit 106.

As described above, the stereoscopic mesh generating unit 106 connects the vertices translated in the depth direction with lines so that each plane defined by the lines forms a triangle as in FIG. 11. Accordingly, a stereoscopic mesh as illustrated in FIG. 11 is obtained.

It should be noted that the method of generating a stereoscopic mesh is not limited to the method described above, in which the stereoscopic mesh generating unit 106 generate a stereoscopic mesh by connecting vertices which represent pixels with lines so that each plane defined by the lines forms a triangle. For example, the stereoscopic mesh generating unit 106 may connect vertices with curved lines, or connect vertices with lines so that each plane forms a shape other than a triangle.

The recognition pattern applying unit 107 applies, to a stereoscopic mesh, a recognition pattern which is a predetermined pattern or a pattern generated by the recognition pattern applying unit 107.

Figure 12:
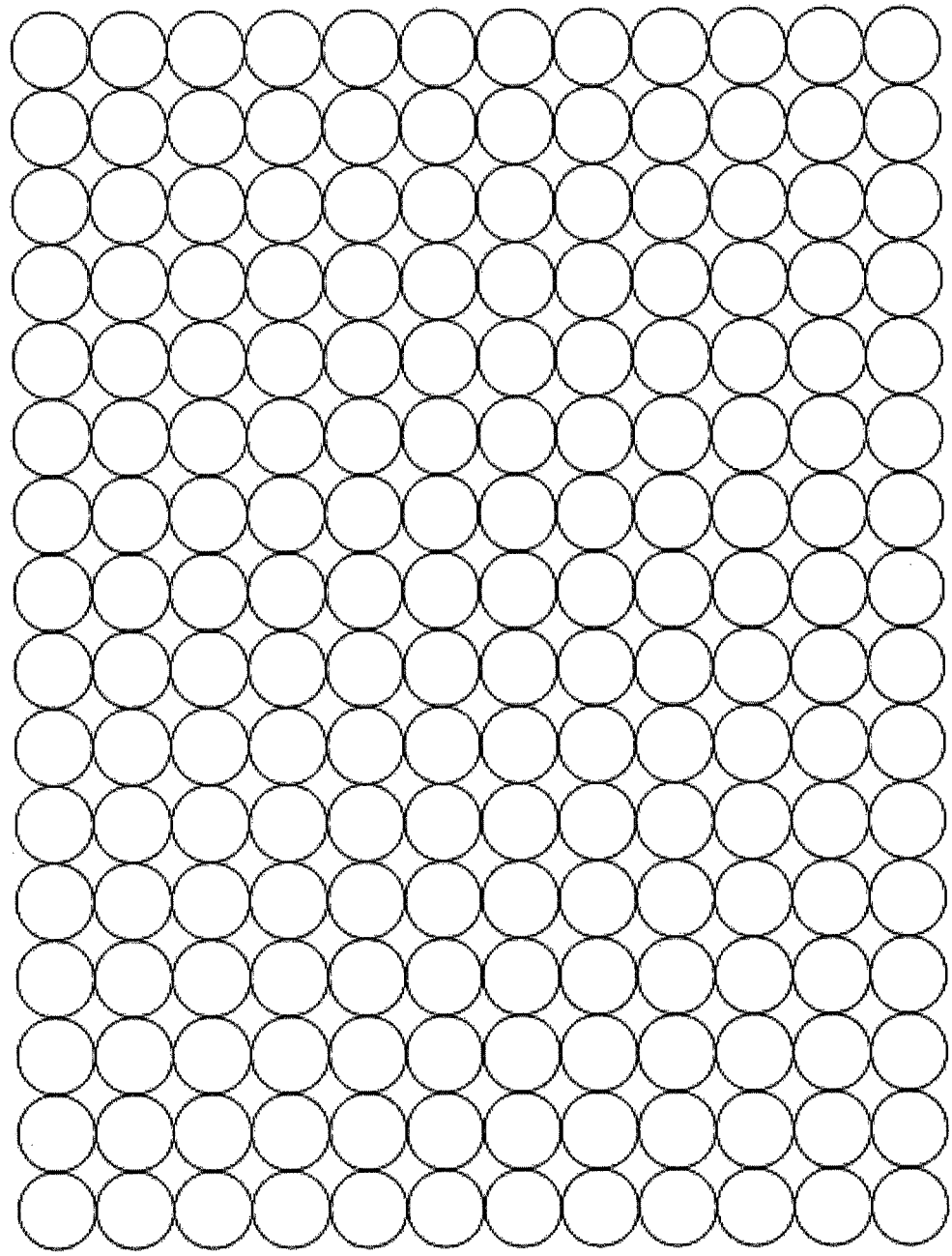
FIG. 12 illustrates an example of an original recognition pattern which is to be applied to the stereoscopic mesh by the recognition pattern applying unit.

FIG. 12 illustrates an example of the recognition pattern which is to be applied to a stereoscopic mesh by the recognition pattern applying unit 107. In Embodiment 1, a regular pattern is used which is an array of circles of the same shape arranged adjacent to one another as illustrated in FIG. 12.

Use of such a regular pattern can alleviate the load of applying a recognition pattern to a stereoscopic mesh.

A similar effect can be achieved with a recognition pattern other than the regular pattern that is an array of circles of the same shape arranged adjacent to one another, unless the recognition pattern is patternless, that is, has a uniform luminance and a uniform color. A desirable pattern for the recognition pattern is a pattern which does not evoke a particular meaning or message, for example, an inorganic and continuous pattern. With this, when a viewer stereoscopically views a left-eye image and a right-eye image each of which is combined with the recognition pattern which is described later, the viewer can recognize the disparity more clearly between the left-eye image and the right-eye image.

Moreover, as another example, the recognition pattern may be an irregular pattern. When an irregular recognition pattern is used and a viewer stereoscopically views a left-eye image and a right-eye image each of which is combined with the random recognition pattern, which is described later, the viewer can recognize the disparity even more clearly between the left-eye image and the right-eye image.

Next, the process of applying the recognition pattern to the stereoscopic mesh by the recognition pattern applying unit 107 is described in more detail.

First, the recognition pattern applying unit 107 arranges smallest units of the recognition pattern tightly on a development diagram of the stereoscopic mesh generated by the stereoscopic mesh generating unit 106.

Figure 13:
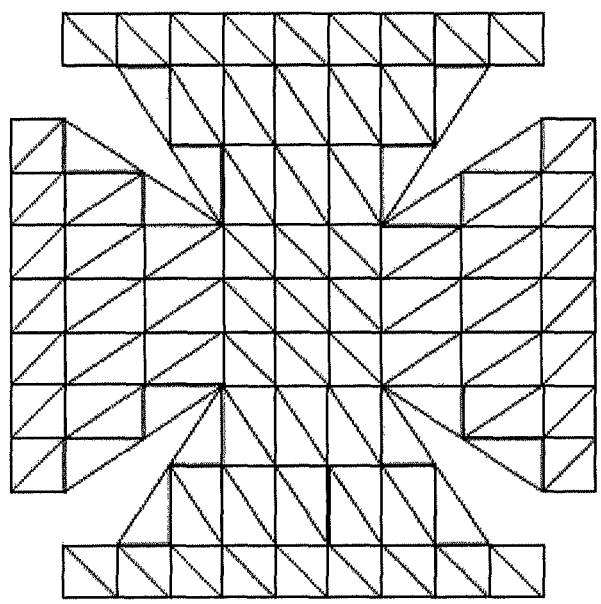
FIG. 13 is a development diagram of the stereoscopic mesh in FIG. 11.

FIG. 13 is the development diagram of the stereoscopic mesh in FIG. 11.

Figure 14:
FIG. 14 illustrates the smallest unit of the regular recognition pattern.

FIG. 14 illustrates the smallest unit of the regular recognition pattern. It should be noted that the square around the circle of the smallest unit of the recognition pattern in FIG. 14 indicates a boundary of the smallest unit of the recognition pattern. Thus, the actual smallest unit of the recognition pattern is only the pattern of the circle.

Figure 15:
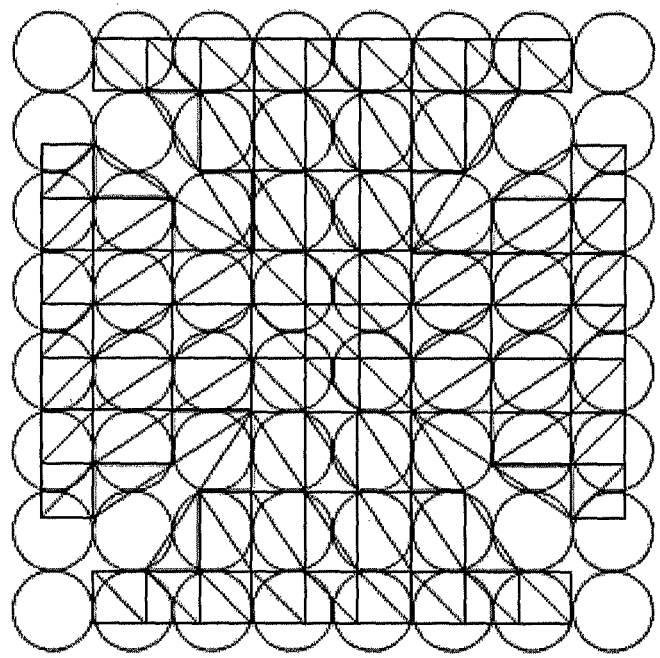
FIG. 15 is a diagram in which smallest units of the recognition pattern are arranged tightly on the development diagram in FIG. 13.

FIG. 15 is a diagram in which the smallest units of the recognition pattern are arranged tightly on the development diagram in FIG. 13.

Next, the recognition pattern applying unit 107 deletes the portions of the recognition pattern that do not correspond to the development diagram of the stereoscopic mesh, the recognition pattern including the smallest units arranged tightly. Subsequently, the recognition pattern applying unit 107 copies the obtained recognition pattern for the stereoscopic mesh on the development diagram.

Figure 16:
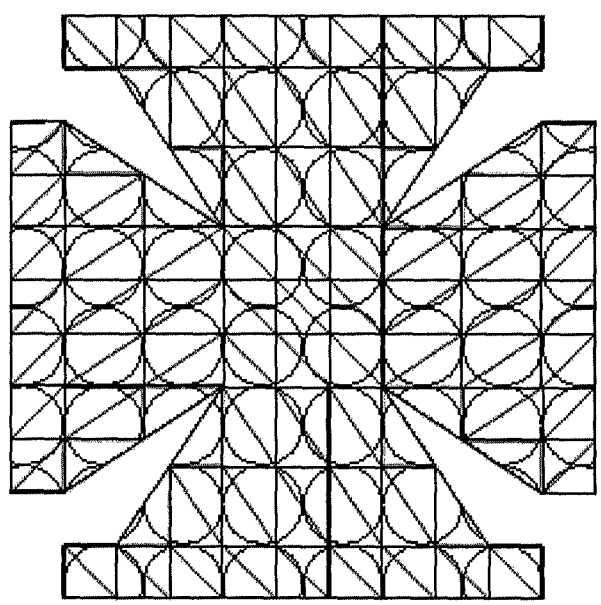
FIG. 16 illustrates a result of copying the recognition pattern on the stereoscopic mesh.

FIG. 16 illustrates the result of copying the recognition pattern on the stereoscopic mesh.

Finally, the recognition pattern applying unit 107 assembles the developed stereoscopic mesh having the recognition pattern copied thereon into the original stereoscopic mesh as one illustrated in FIG. 11.

As described above, the recognition pattern applying unit 107 applies a recognition pattern to the stereoscopic mesh. A recognition image is an image of the recognition pattern that is applied to the stereoscopic mesh and viewed from a certain viewpoint. The recognition image an image showing a pattern corresponding to a stereoscopic image obtained by stereoscopically viewing a left-eye image and a right-eye image. In other words, the recognition image is an image which reflects depth information in a stereoscopic image on a recognition pattern (pattern).

Figure 17:
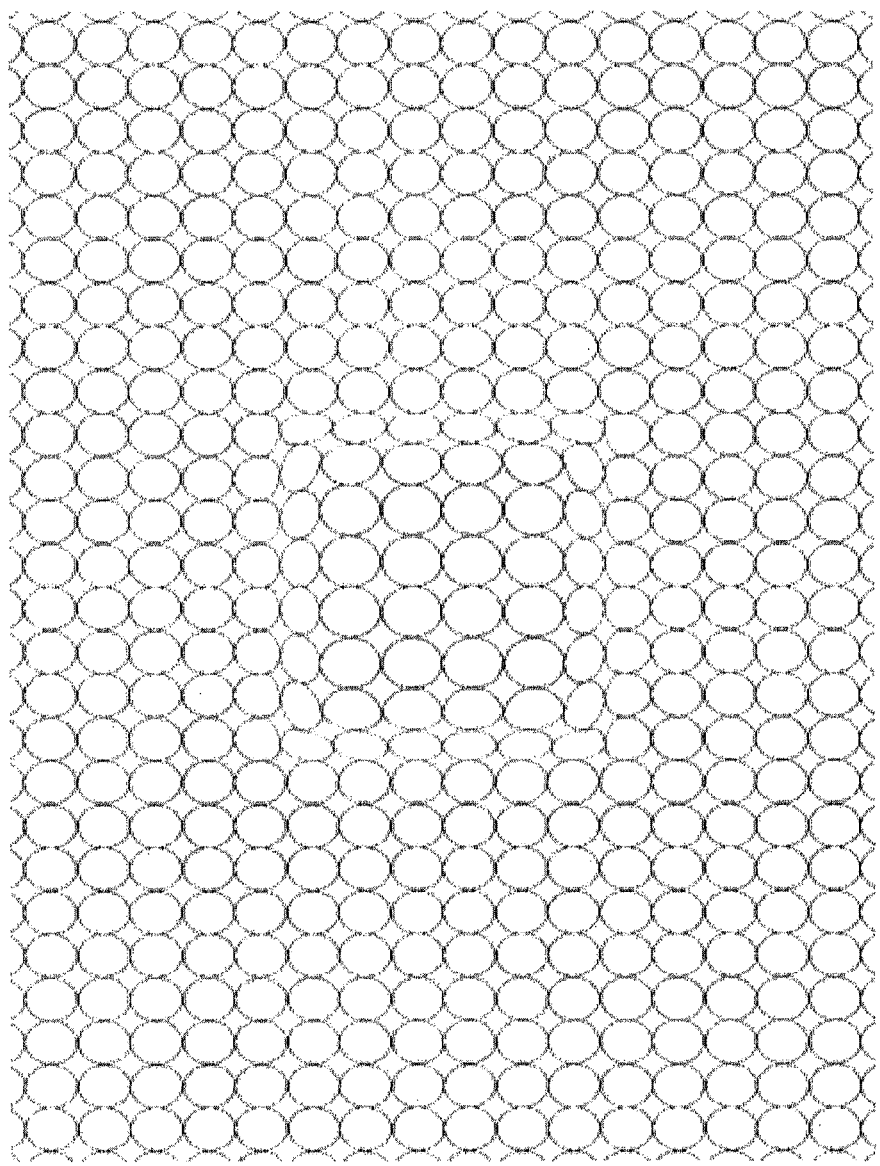
FIG. 17 illustrates a result obtained by applying the recognition pattern in FIG. 12 to the stereoscopic mesh.

FIG. 17 illustrates a recognition image obtained by applying the recognition pattern in FIG. 12 to the stereoscopic mesh in FIG. 8. FIG. 17 illustrates the recognition pattern obtained by capturing the recognition pattern in FIG. 12 attached to the stereoscopic mesh in FIG. 8 from the middle point of the two viewpoints indicated by the viewpoint position information described above. In short, the recognition image is an image that reflects depth information of an image by using the stereoscopic mesh.

The right/left recognition image generating unit 108 uses the stereoscopic mesh having the recognition pattern applied thereto and the viewpoint position information, to generate a right-eye recognition image which is to be combined with the right-eye image and a left-eye recognition image which is to be combined with the left-eye image. The right-eye recognition image has a pattern representing the depth of the right-eye image and is to be combined with the right-eye image. The left-eye recognition image has a pattern representing the depth of the left-eye image and is to be combined with the left-eye image.

Figure 18:
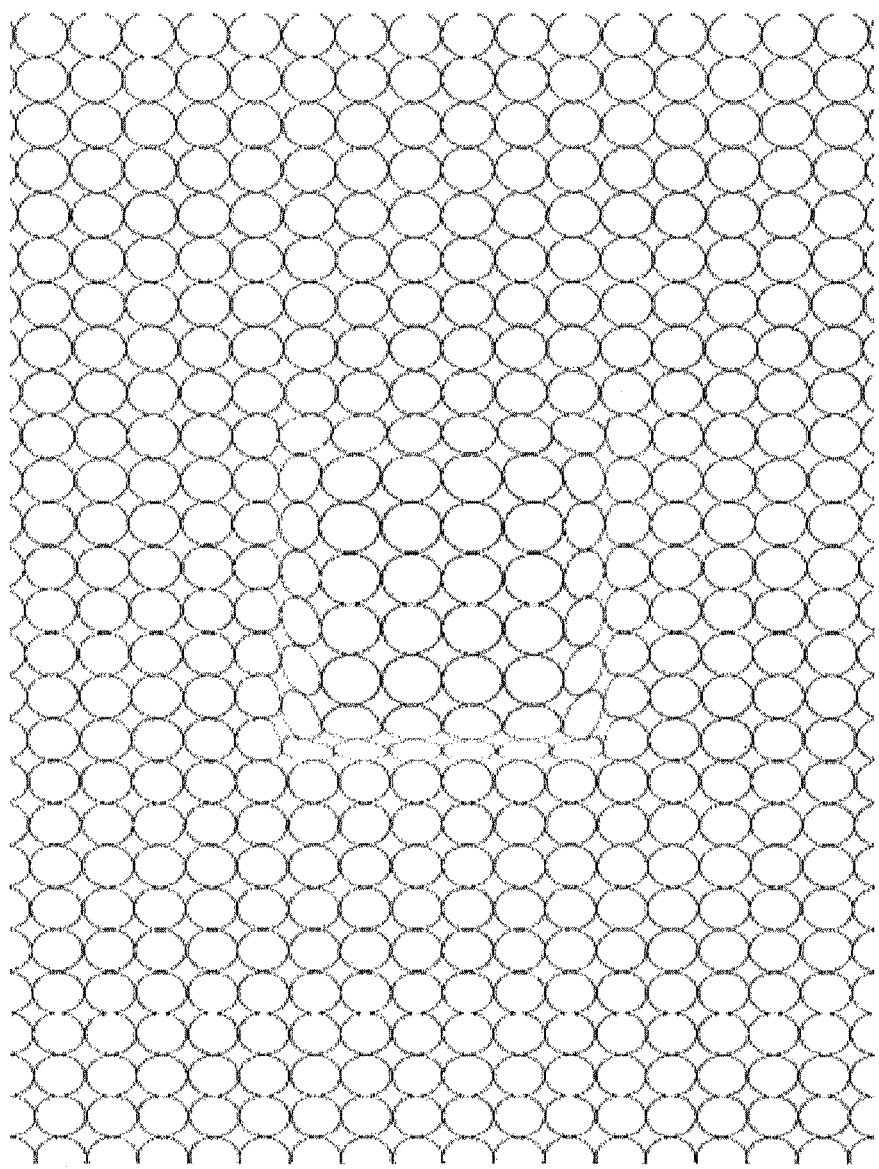
FIG. 18 illustrates an example of the right-eye recognition image.

FIG. 18 illustrates an example of the right-eye recognition image.

Figure 19:
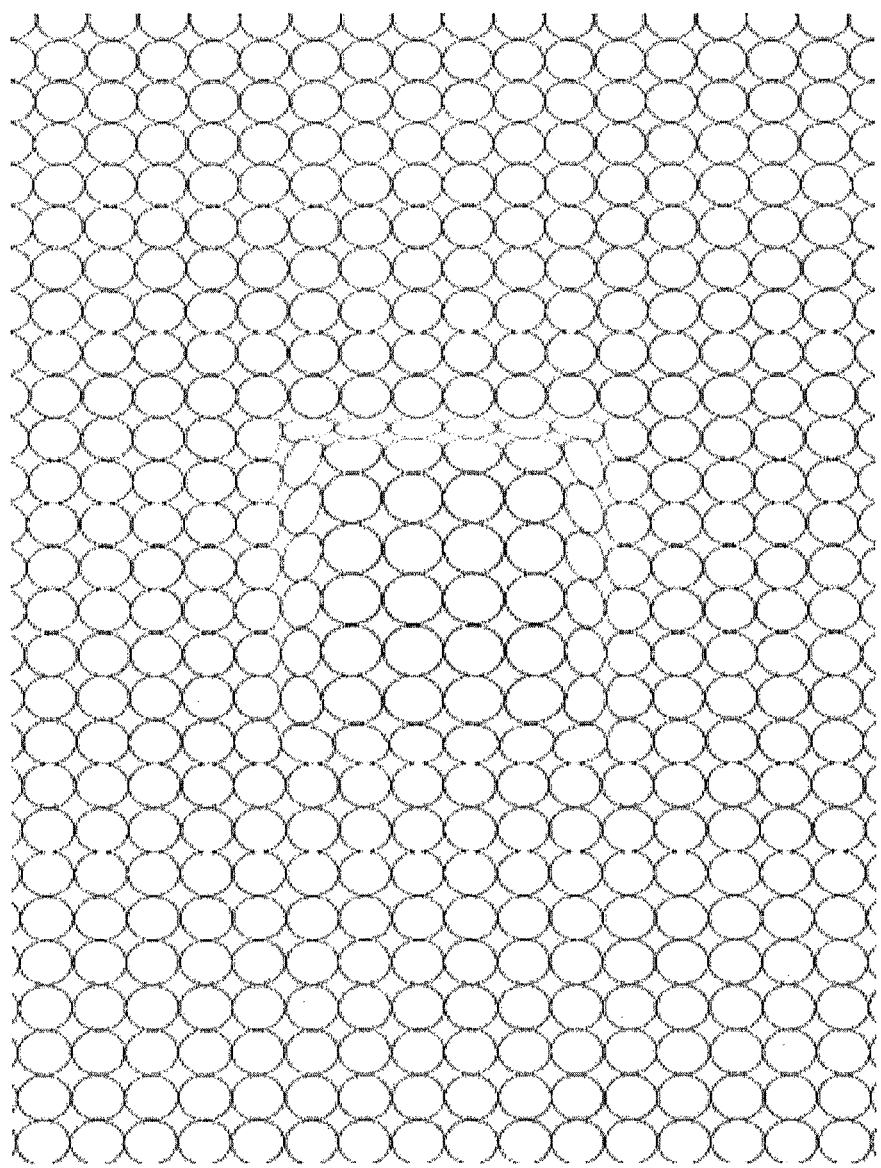
FIG. 19 illustrates an example of the left-eye recognition image.

FIG. 19 illustrates an example of the left-eye recognition image.

Specifically, the right/left recognition image generating unit 108 generates a right-eye image using an image obtained from a virtual image capturing unit. The virtual image capturing unit captures the recognition pattern applied to the stereoscopic mesh with settings indicated by the viewpoint position information, namely, the position, the orientation, and the focal length at the time that the right-eye image is captured. Likewise, the right/left recognition image generating unit 108 generates a left-eye image using an image obtained from the virtual image capturing unit. The virtual image capturing unit captures the recognition pattern applied to the stereoscopic mesh with settings indicated by the viewpoint position information, namely, the position, the orientation, and the focal length at the time that the left-eye image is captured.

It should be noted that the above-described processes of generating the stereoscopic mesh, generating the recognition image (applying the recognition pattern), and generating the right-eye image and left-eye image can be achieved by, for example, applying algorithms used in commercially available and widely known 3D CAD software.

It should be noted that, in the recognition images illustrated in FIGS. 17, 18, and 19, the portions outside the diagram indicate the portions without image data. In other words, the image combining unit which will be described later uses only the portions within the diagrams (portions having a pattern) to generate a combined image.

The right/left recognition image generating unit 108 outputs the generated right-eye recognition image and left-eye recognition image to the image combining unit 109.

The image combining unit 109 combines the right-eye recognition image with the right-eye image, and combines the left-eye recognition image with the left-eye image.

Figure 20:
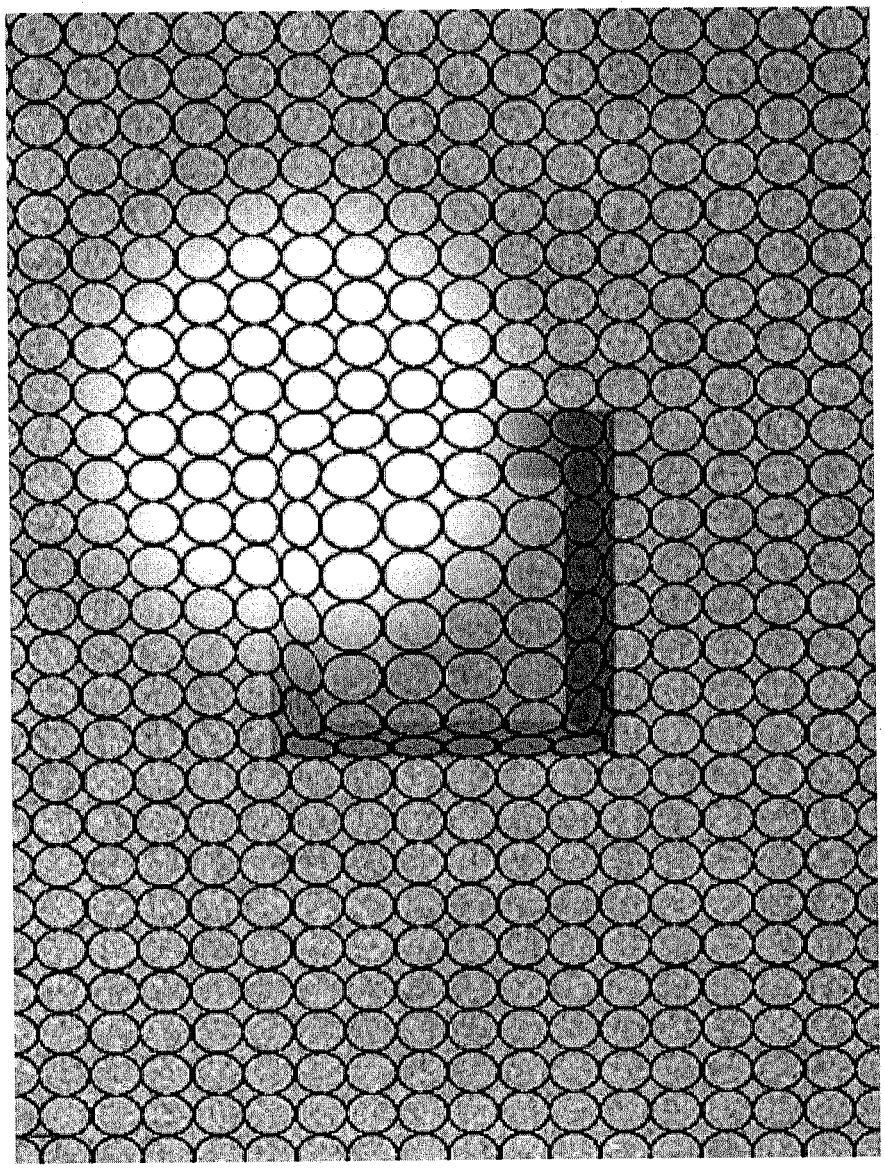
FIG. 20 illustrates an image generated by combining the right-eye recognition image with the right-eye image.

FIG. 20 illustrates an image generated by combining the right-eye recognition image with the right-eye image.

Figure 21:
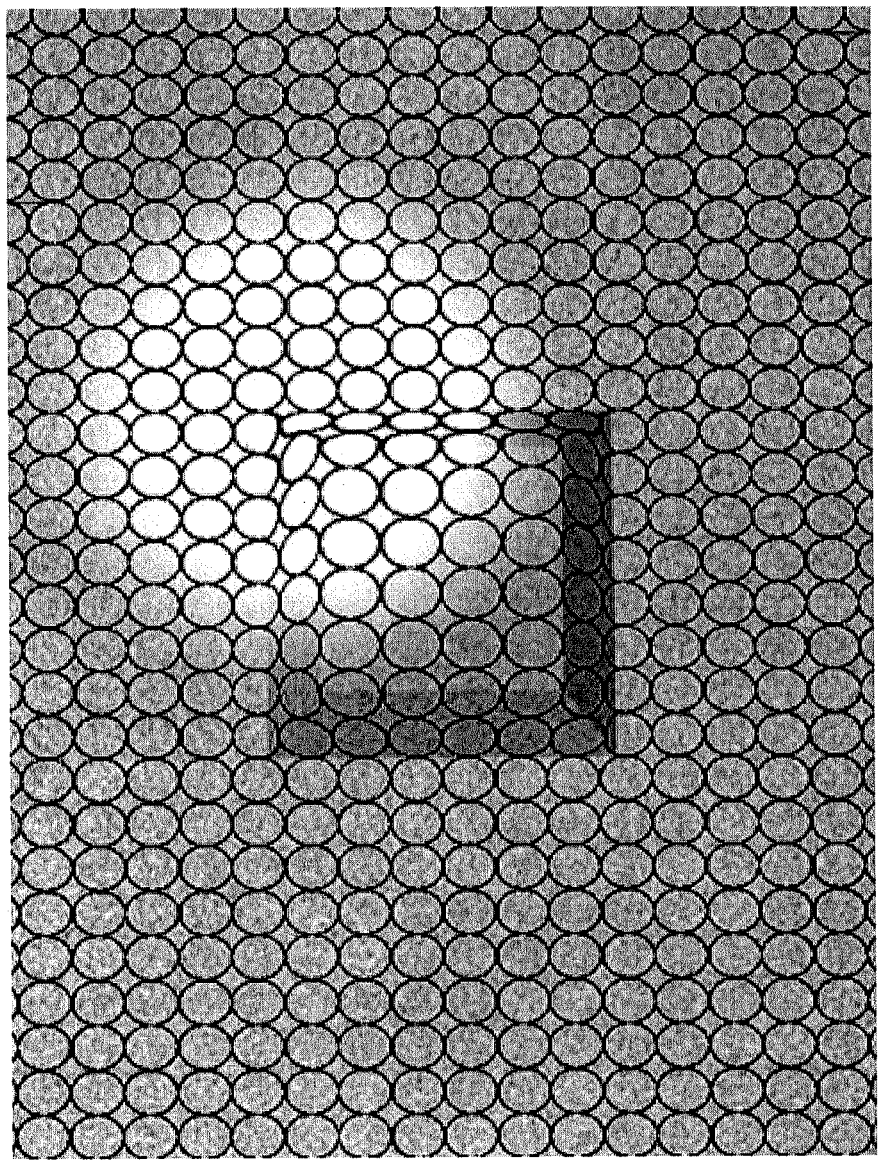
FIG. 21 illustrates an image generated by combining the left-eye recognition image with the left-eye image.

FIG. 21 illustrates an image generated by combining the left-eye recognition image with the left-eye image.

Since an image with flared highlights is used as an example in this embodiment, the image combining unit 109 compares a luminance value of each pixel by superimposing an image and its corresponding recognition image, and combines the image using a lower luminance value of each pixel as the luminance value of the corresponding pixel of the combined image.

For example, the image combining unit 109 compares a luminance value of each pixel by superimposing the right-eye (left-eye) image and the right-eye (left-eye) recognition image. When the pixel of the right-eye (left-eye) image has a lower luminance value, the luminance value of the right-eye (left-eye) image is used as the luminance value of the corresponding pixel of the combined right-eye (left-eye) image.

In the foregoing, the portions outside the diagrams is described to indicate portions without image data, but the portions outside the diagrams may be used as portions having a maximum luminance (white) when the image has flared highlights and a combined image is generated by comparing luminance values as in the above descriptions.

Conversely, when the image has blocked-up shadows, the image combining unit 109 compares a luminance value of each pixel by superimposing the right-eye (left-eye) image and the right-eye (left-eye) recognition image. When the pixel of the right-eye (left-eye) recognition image has a higher luminance value, the luminance value of the right-eye (left-eye) recognition image is used as the luminance value of the corresponding pixel of the combined right-eye (left-eye) image.

In the foregoing, the portions outside the diagrams is described to indicate portions without image data, but the portions outside the diagrams may be used as portions having a minimum luminance (black) when the image has blocked-up shadows and a combined image is generated by comparing luminance values as in the above descriptions.

It should be noted that the method of combining images is not limited to the above method. Any method of combining images may be used, provided that a viewer can recognize the recognition pattern in a combined image.

In addition, when the right-eye (left-eye) image and the right-eye (left-eye) recognition image are different in size, one of the images is reduced or enlarged to make the images the same size.

Moreover, when the image has blocked-up shadows, the image combining unit 109 compares a luminance value of each pixel in an image and that of each pixel in a recognition image corresponding to the image by superimposing the image and the recognition image. Then, the image combining unit 109 generates a combined image using a higher luminance value as the luminance value of the combined image.

It should be noted that both cases of blocked-up shadows and flared highlights are addressable by setting the color of the portions having a pattern in the recognition image (portions illustrated in the diagrams) to gray that is a neutral color between black and white.

Moreover, the color and luminance of the portions having a pattern in the recognition image (portions illustrated in the diagrams) to be combined may be reversed in the combined image according to luminance values of surrounding portions of the recognition image.

The left-eye image and the right-eye image illustrated in FIGS. 20 and 21, each of which is combined with the corresponding one of the recognition images, are output to a display device capable of reproducing stereoscopic images.

When FIGS. 20 and 21 are stereoscopically viewed on such a display device or the like, a viewer can see that the stereoscopic effect of the upper-right portion of the square truncated pyramid is compensated, although the stereoscopic effect of the upper-right portion has been lost when the right-eye image (FIG. 3) and the left-eye image (FIG. 4) are viewed stereoscopically before each of which is combined with the corresponding one of the recognition images.

The above-described operations of the image processing device 101 in Embodiment 1 are described with a flowchart.

Figure 22:
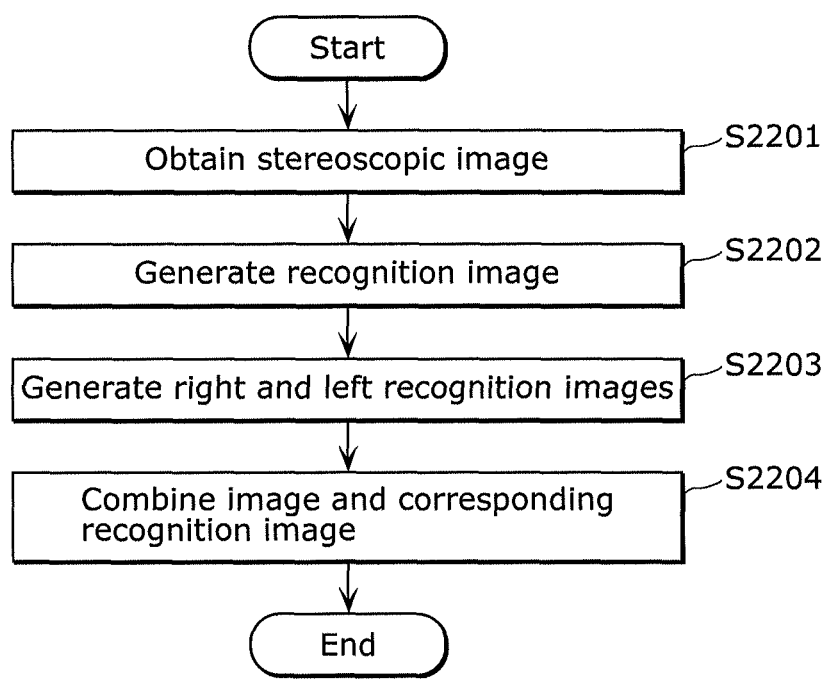
FIG. 22 is a flowchart of operations of the image processing device.

FIG. 22 is a flowchart of the operations of the image processing device 101.

First, the obtaining unit 104 obtains a stereoscopic image (S2201).

Next, a recognition pattern (recognition image) applied to a stereoscopic mesh is generated (S2202).

Subsequently, the image processing device 101 processes the recognition image into a recognition image which is assumed to be captured by a virtual image capturing unit. The image processing device 101 generates, based on the viewpoint position information, a right-eye recognition image corresponding to the right-eye image and a left-eye recognition image corresponding to the left-eye image (S2203).

Finally, each of the generated recognition images is combined with a corresponding one of the left-eye image or the right-eye image (S2204).

With this process, a viewer can recognize the disparity between the left-eye and right-eye images after each of which is combined with the corresponding one of the recognition images, in the portion that has lost details in the left-eye image or the right-eye image before being combined with the corresponding one of the recognition images. In other words, the image processing device 101 can compensate for the stereoscopic effect of the stereoscopic image.

It should be noted that the image processing device 101 may include a detecting unit for detecting a portion (target portion) which needs image processing (in which a stereoscopic effect needs compensation) by the image processing device 101 in the image obtained by the obtaining unit 104, such as a portion with flared highlights or the like. The target portion is, in other words, a portion which has lost details in the image.

In this case, compensation for a stereoscopic effect, which is the procedure in the flowchart in FIG. 22, may be performed only when the detecting unit detects a target portion. In other words, the image combining unit combines the right-eye recognition image with right-eye image and combines the left-eye recognition image with left-eye image only when a target portion is detected.

The detecting unit detects a region in which the stereoscopic effect needs compensation, for example, by predetermining a threshold value of a luminance value of a pixel and detecting a brighter region having luminance values more than or equal to the threshold value. The brighter region in the image can be determined as a region with flared highlights or low contrast, that is, a region having a poor stereoscopic effect.

Similarly, the detecting unit detects a region in which the stereoscopic effect needs compensation, for example, by predetermining a threshold value of a luminance value of a pixel and detecting, in the image, a darker region corresponding to pixels having luminance values less than or equal to the threshold value. The darker region in the image can be determined as a region having blocked-up shadows or low contrast, that is, a region having a poor stereoscopic effect.

Moreover, the detecting unit may calculates distribution of the contrast in the right-eye image and the left-eye image to detect a region having low contrast as a target region in which the stereoscopic effect needs compensation. The region having low contrast can be detected, for example, by dividing the image into a plurality of blocks, and determining distribution of frequency components in each block. Specifically, distribution of frequency components in each block is calculated, and a block having distribution of relatively lower frequencies can be detected as a block having low contrast than a block having distribution of relatively higher frequencies. The region having low contrast tends to produce a less stereoscopic effect for a viewer than a region having high contrast, and thus the region having low contrast is determined as a region having a poor stereoscopic effect.

It should be noted that the recognition image may be combined only with the target region in which the stereoscopic effect needs compensation in an image and which is detected by the detecting unit.

Moreover, the image combining unit 109 may change a likelihood of perception of the recognition image according to the result detected by the detecting unit. For example, the process may be controlled in such a way that, when a target region is detected by the detecting unit using contrast of an image as described above, the region having low contrast may be processed to compensate for a stereoscopic effect so that the recognition image is likely to be perceived by a viewer. A region having high contrast may be processed to compensate for a stereoscopic image so that the recognition image is unlikely to be perceived by the viewer, or does not need to be processed at all.

This allows the image processing device 101 to compensate for a stereoscopic effect of a stereoscopic image more naturally.

Moreover, a target region in which the stereoscopic effect needs compensation may be combined with the recognition image so that the recognition image is likely to be perceived by a viewer, and a region other than the target region may be combined with the recognition image so that the recognition image is unlikely to be perceived by the viewer.

Specifically, the luminance of the recognition image may be changed to be combined so that, in the target region in the combined image, the difference in color phase between the recognition image and the original image is smaller. Conversely, the luminance in a region other than the target region in the recognition image may be changed to be combined so that, in the region other than the target region, the difference in color phase between the recognition image and the original image is larger.

Moreover, in the target region, an area closer to a region other than the target region may be combined with the recognition image so that the area closer to a region other than the target region is more unlikely to be perceived by a viewer.

Specifically, in the target region in the combined image, the luminance of the recognition image may be set lower in an area closer to a region other than the target region. Moreover, the luminance of the recognition image may be changed to be combined so that, in an area closer to a region other than the target region in the combined image, the difference in color phase is smaller between the recognition image and the original image.

Moreover, the detecting unit may detect the target region by using complex and multiple indicator values, such as distributions of the above-mentioned flared highlights, blocked-up shadows, and contrast, for indicating necessity of compensation for the stereoscopic effect. This enables an amount of combining the recognition image (likeliness to be perceived by a viewer) to be gradually changed according to the indicator values. As a result, the stereoscopic effect can be compensated with a minimum change in the atmosphere of the original image.

Figure 23:
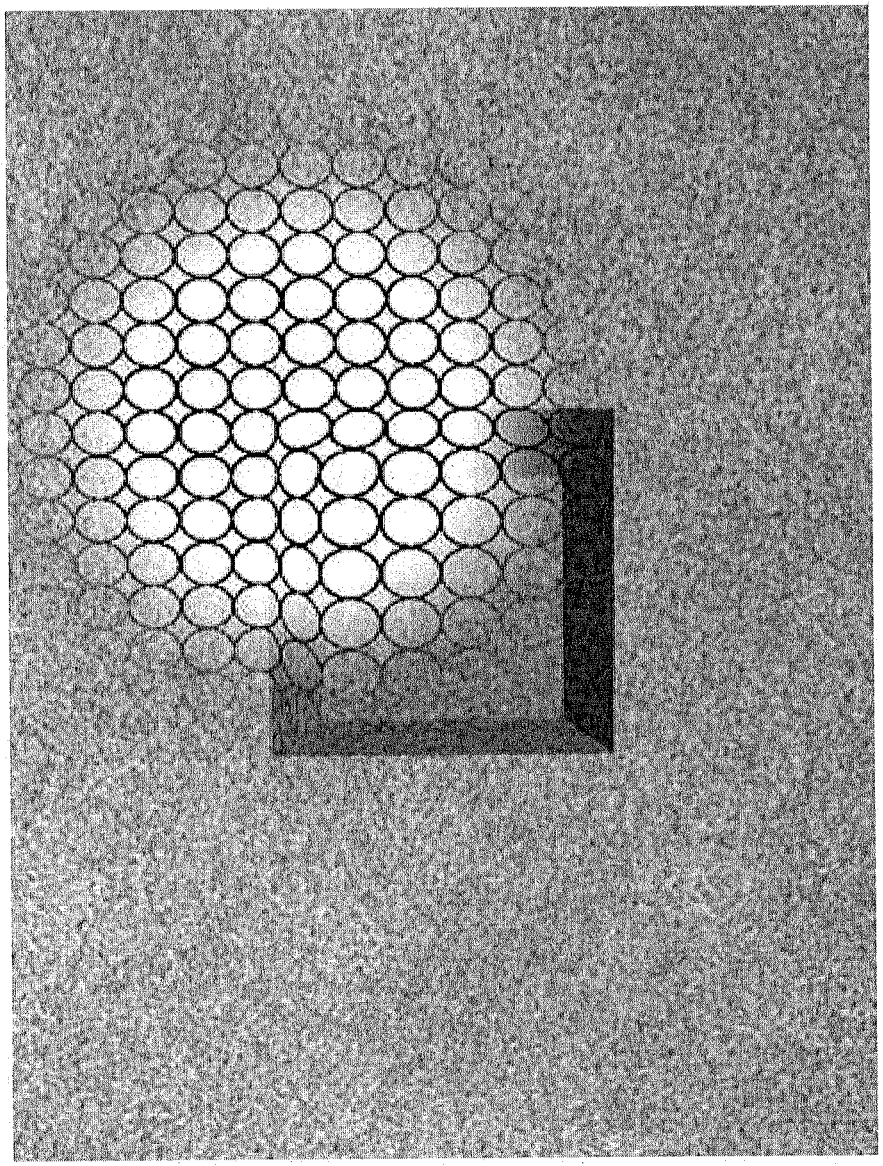
FIG. 23 illustrates an image in which the recognition image is gradually combined with a portion in which the stereoscopic effect needs compensation.

FIG. 23 illustrates a right-eye image in which the recognition image is gradually combined with a portion in which the stereoscopic effect needs compensation.

Figure 24:
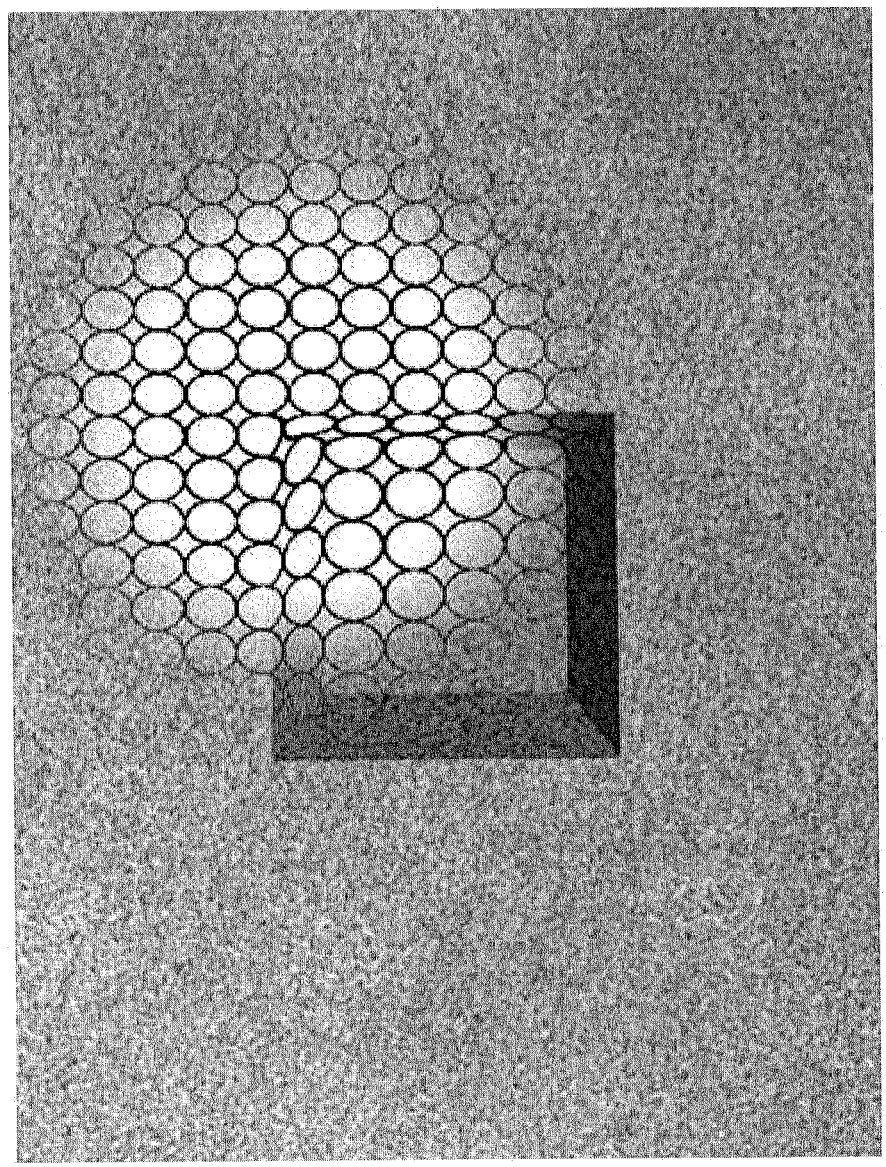
FIG. 24 illustrates an image in which the recognition image is gradually combined with a portion in which the stereoscopic effect needs compensation.

FIG. 24 illustrates a left-eye image in which the recognition image is gradually combined with a portion in which the stereoscopic effect needs compensation.

In FIGS. 23 and 24, the amount of combining the recognition image (likeliness to be perceived by a viewer) is gradually changed in the image starting from a region in which the stereoscopic effect needs compensation to a region in which the stereoscopic effect does not need compensation as described above. Therefore, the amount of combining the recognition image is gradually changed in the diagrams.

Accordingly, the compensation for the stereoscopic effect is possible with a minimum change in the atmosphere of the original image by providing the detecting unit to detect a region in which the stereoscopic effect needs compensation and combining the recognition image with the region.

In the foregoing Embodiment 1, it is described that details of the right-eye and left-eye images which are obtained by the obtaining unit 104 have been lost at the time of capturing the images by the image capturing unit. However, the present invention is not limited to compensate for the stereoscopic effect of a portion which has been lost beforehand. The present invention may be applied in a similar manner to compensate for details being missed during the post-production process of images after the image capturing. As an example, the case where an image is airbrushed is described.

Figure 25:
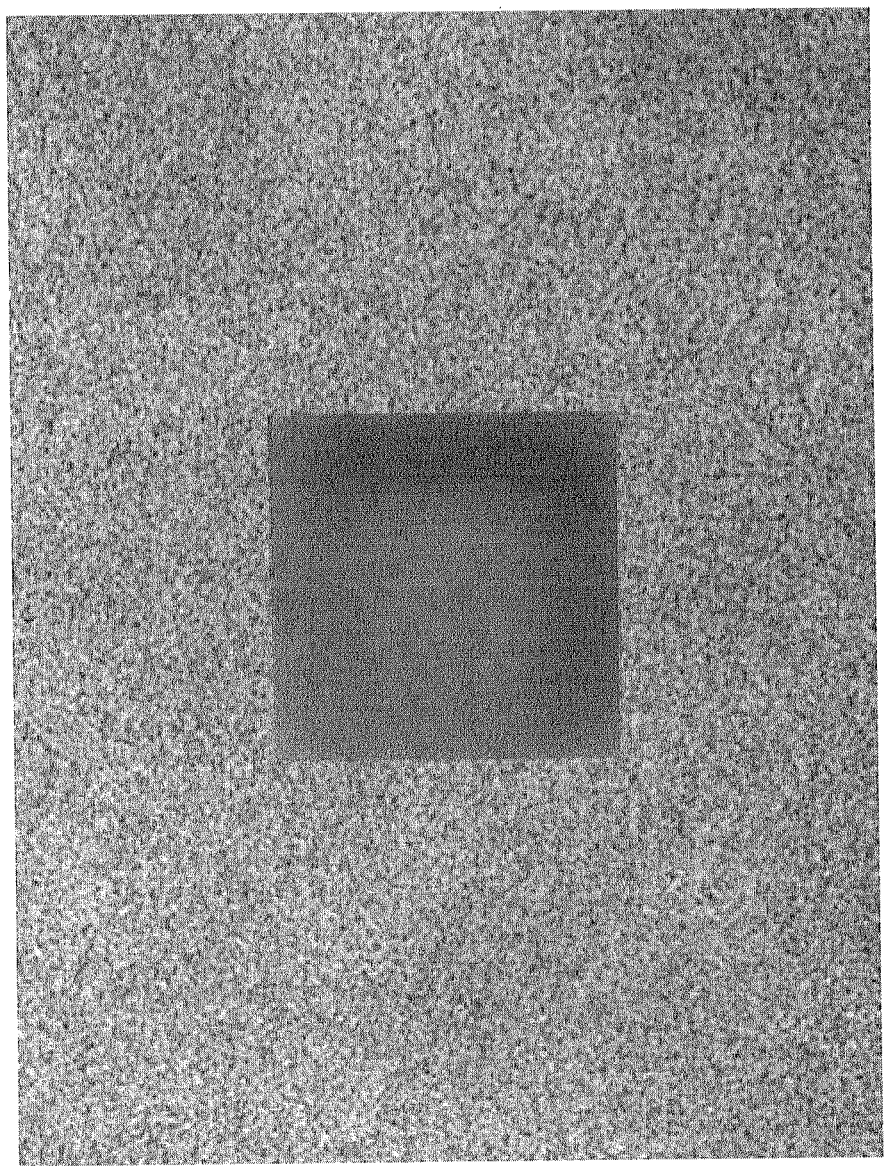
FIG. 25 illustrates a subject being airbrushed in a right-eye image which does not have flared highlights.

FIG. 25 illustrates the subject (portion of the square truncated pyramid) being airbrushed in a right-eye image which does not have flared highlights as in FIG. 5.

Figure 26:
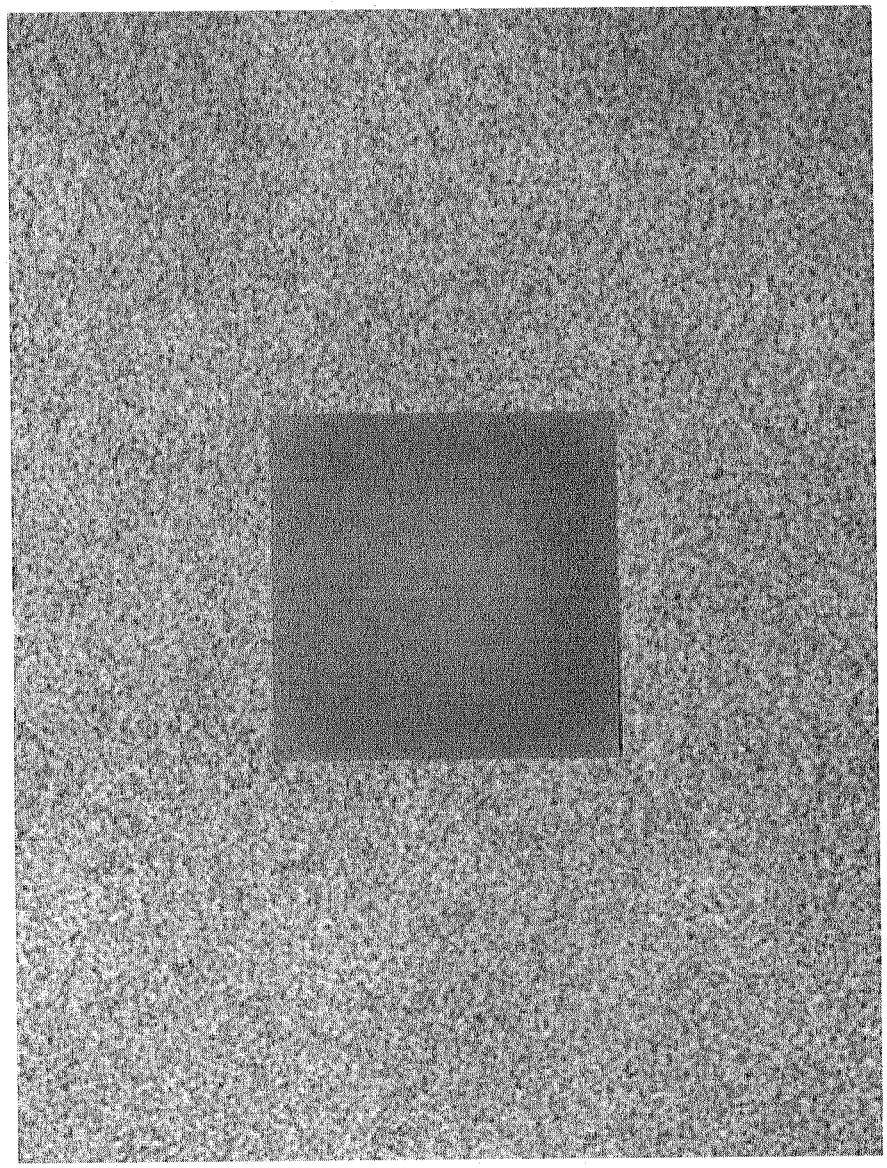
FIG. 26 illustrates a subject being airbrushed in a left-eye image which does not have flared highlights.

Similarly, FIG. 26 illustrates the subject being airbrushed in a left-eye image which does not have flared highlights as in FIG. 6.

When the two images in FIGS. 25 and 26 are viewed stereoscopically, it can be seen that the stereoscopic effect of the subject of the square truncated pyramid is remarkably missing.

The image processing device 101 can compensate for and restore the stereoscopic effect of the subject of the square truncated pyramid even for such images by combining the recognition image by the image combining unit 109.

Figure 27:
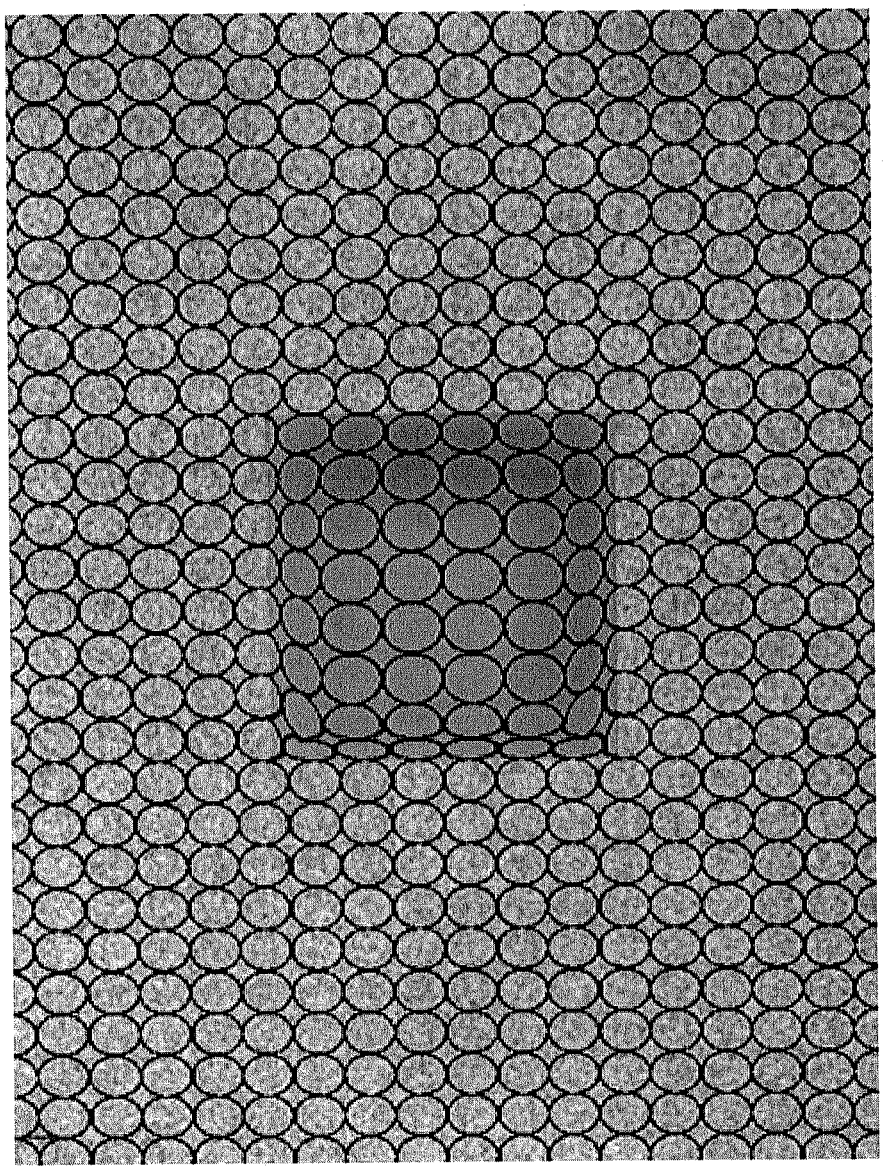
FIG. 27 illustrates an image generated by combining the right-eye recognition image in FIG. 18 with the right-eye image in FIG. 25.

FIG. 27 illustrates an image generated by combining the right-eye recognition image in FIG. 18 with the right-eye image in FIG. 25.

Figure 28:
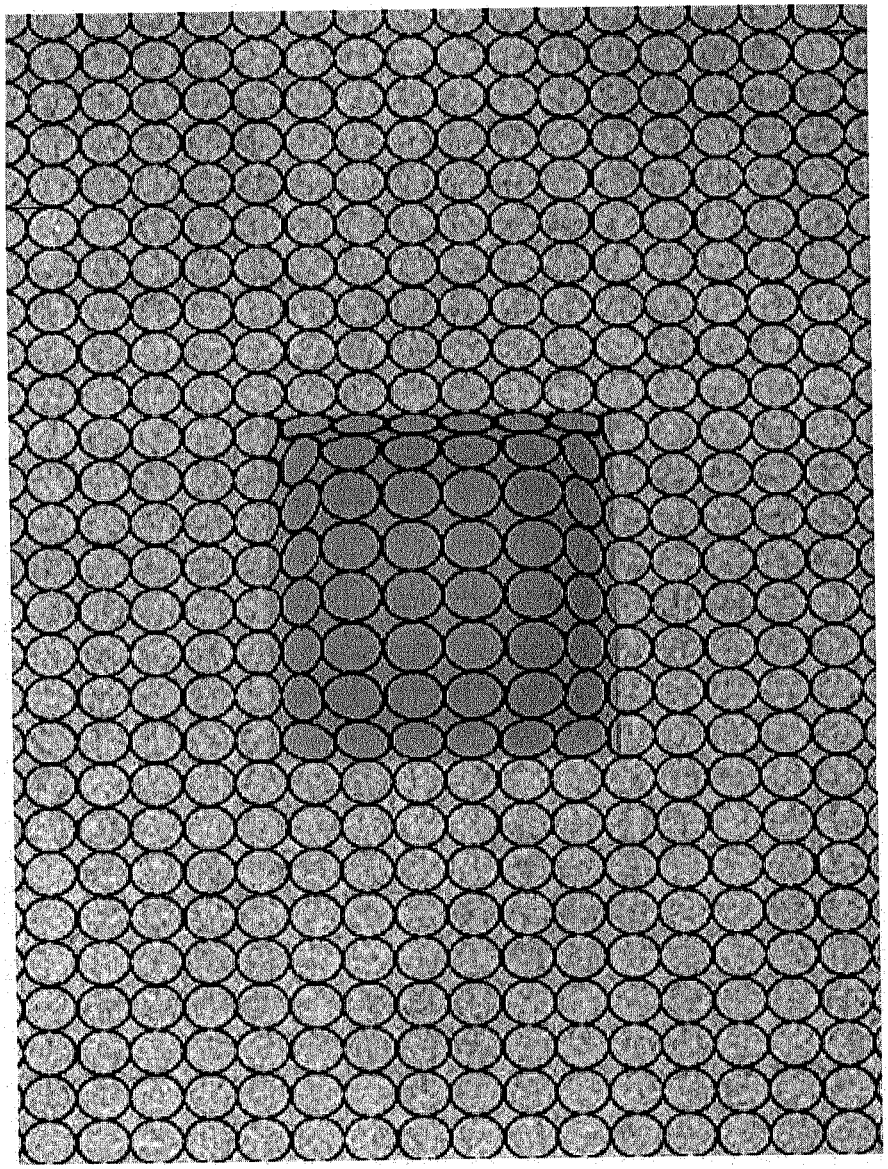
FIG. 28 illustrates an image generated by combining the left-eye recognition image in FIG. 19 with the left-eye image in FIG. 26.

FIG. 28 illustrates an image generated by combining the left-eye recognition image in FIG. 19 with the left-eye image in FIG. 26.

By stereoscopically viewing the two images in FIGS. 27 and 28, it can be seen that the stereoscopic effect of the square truncated pyramid is compensated and the stereoscopic effect of the stereoscopic image is restored.

In Embodiment 1, the right-eye image and the left-eye image obtained by the obtaining unit 104 are described as images captured by the image capturing unit capturing a subject that actually exists. It should be noted that, however, the obtaining unit 104 may obtain a stereoscopic image which is in a game or drawn by a computer such as a CAD system or the like.

Such a stereoscopic image that is drawn by a computer or the like is often processed so that the subject drawn has a smooth surface, and thus the stereoscopic image drawn by a computer or the like often has a poor stereoscopic effect when the image is viewed stereoscopically. The stereoscopic effect can be added to a certain extent, by deliberately making the surface of the subject in the stereoscopic image ununiform when a computer generates the stereoscopic image. However, such a process is a heavy load, and thus this process has a disadvantage that the drawing performance of the computer is extremely degraded.

Moreover, when an image is generated by a computer and a subject in the image has blocked-up shadows or flared highlights due to a virtual light source or the like, the stereoscopic effect cannot be compensated for even when the surface of the subject is made ununiform as mentioned above. However, the stereoscopic effect can be compensated for even in such a computer-generated image by using the image processing device 101.

Moreover, a lighter load is imposed by the process of detecting a region in which the stereoscopic effect needs compensation and combining the recognition image only with the detected region, compared to the load imposed by the process of always deliberately making the surface of a three-dimensional object ununiform. Thus, the degradation in drawing performance of a computer can be prevented by compensating for a stereoscopic effect by the image processing device 101.

It should be noted that such an image generated for a game or generated by a CAD system may sometimes have information which is directly applicable to the stereoscopic mesh as depth information. In such a case, the recognition pattern applying unit 107 can generate a more accurate recognition image by using the information which is directly applicable to the stereoscopic mesh. In this case, the depth information obtaining unit 102 can be omitted.

It should be noted that the stereoscopic mesh generating unit 106 may generate the depth information from the right-eye image and the left-eye image. In other words, the depth information obtaining unit 102 is not an essential structural element and may be omitted.

Moreover, the right/left recognition image generating unit 108 may generate the right-eye recognition image and the left-eye recognition image by using the disparity between the right-eye image and the left-eye image instead of using the viewpoint position information. In other words, viewpoint position obtaining unit 103 is not an essential structural element and may be omitted.

Figure 29:
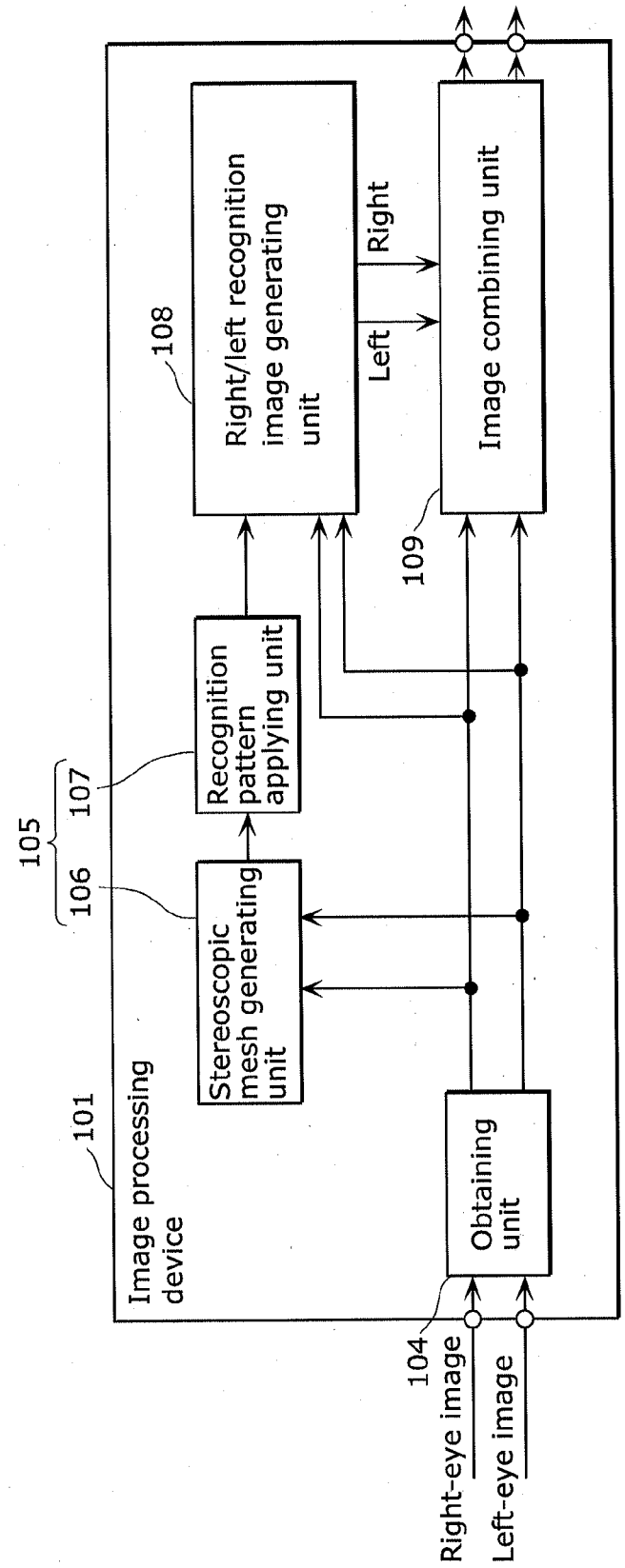
FIG. 29 is a block diagram of the image processing device in the case where the stereoscopic mesh is generated from the right-eye image and the left-eye image.

FIG. 29 is a block diagram of the image processing device 101 in which the depth information obtaining unit 102 and the viewpoint position obtaining unit 103 are omitted.

In FIG. 29, the stereoscopic mesh generating unit 106 uses the right-eye image and the left-eye image instead of the depth information, and calculates the depth information from the correlation of the right-eye image and the left-eye image. Moreover, the stereoscopic mesh generating unit 106 generates a stereoscopic mesh using the depth information and outputs the generated stereoscopic mesh to the recognition pattern applying unit 107. As for the portion which has lost details in the image, the depth information may be calculated by interpolating the image using heuristics of colors included in the image, luminance of the surrounding pixels, or the correlation. It should be noted that the calculation (generation) process of the depth information may be achieved by providing a depth information generating unit which performs the calculation process.

Moreover, the right/left recognition image generating unit 108 uses the right-eye image and the left-eye image instead of the viewpoint information, and generates the right-eye recognition image and the left-eye recognition image from the correlation of the disparity between the right-eye image and the left-eye image. Specifically, the correlation of the disparity can be obtained, for example, by detecting edges of the subject included in the right-eye image and the left-eye image, and calculating positional differences in the horizontal direction between points on the detected edges corresponding to the right-eye image and those corresponding to the left-eye image. Moreover, the right/left recognition image generating unit 108 outputs the generated right-eye recognition image and the left-eye recognition image to the image combining unit 109.

As described above, the image processing device 101 according to Embodiment 1 generates a recognition image in which depth information of the stereoscopic image is patterned, by applying a recognition pattern having a regular pattern to a stereoscopic mesh representing the depth information. Subsequently, a left-eye recognition image corresponding to the left-eye image and a right-eye recognition image corresponding to the right-eye image are generated, and the corresponding images are combined. Accordingly, a difference is generated between the left-eye image and the right-eye image. With this, a viewer can clearly recognize the disparity between the left-eye image and the right-eye image and thus the stereoscopic effect of the stereoscopic image can be compensated.

Embodiment 2

The image processing device 101 according to Embodiment 2 is described below.

In Embodiment 1, a regular pattern is used as the recognition pattern, but in Embodiment 2, an example of using an irregular pattern as the recognition pattern is described to compensate for the stereoscopic effect of the stereoscopic image. It should be noted that configurations and operations that are not described in Embodiment 2 are the same as in Embodiment 1 unless otherwise specified.

In Embodiment 1, when a regular recognition pattern as in FIG. 12 is used to compensate for the stereoscopic effect, the atmosphere of the original stereoscopic image is sometimes significantly changed.

In addition, the stereoscopic effect is not sometimes compensated sufficiently when a regular recognition pattern is used to compensate for the stereoscopic effect.

Figure 30:
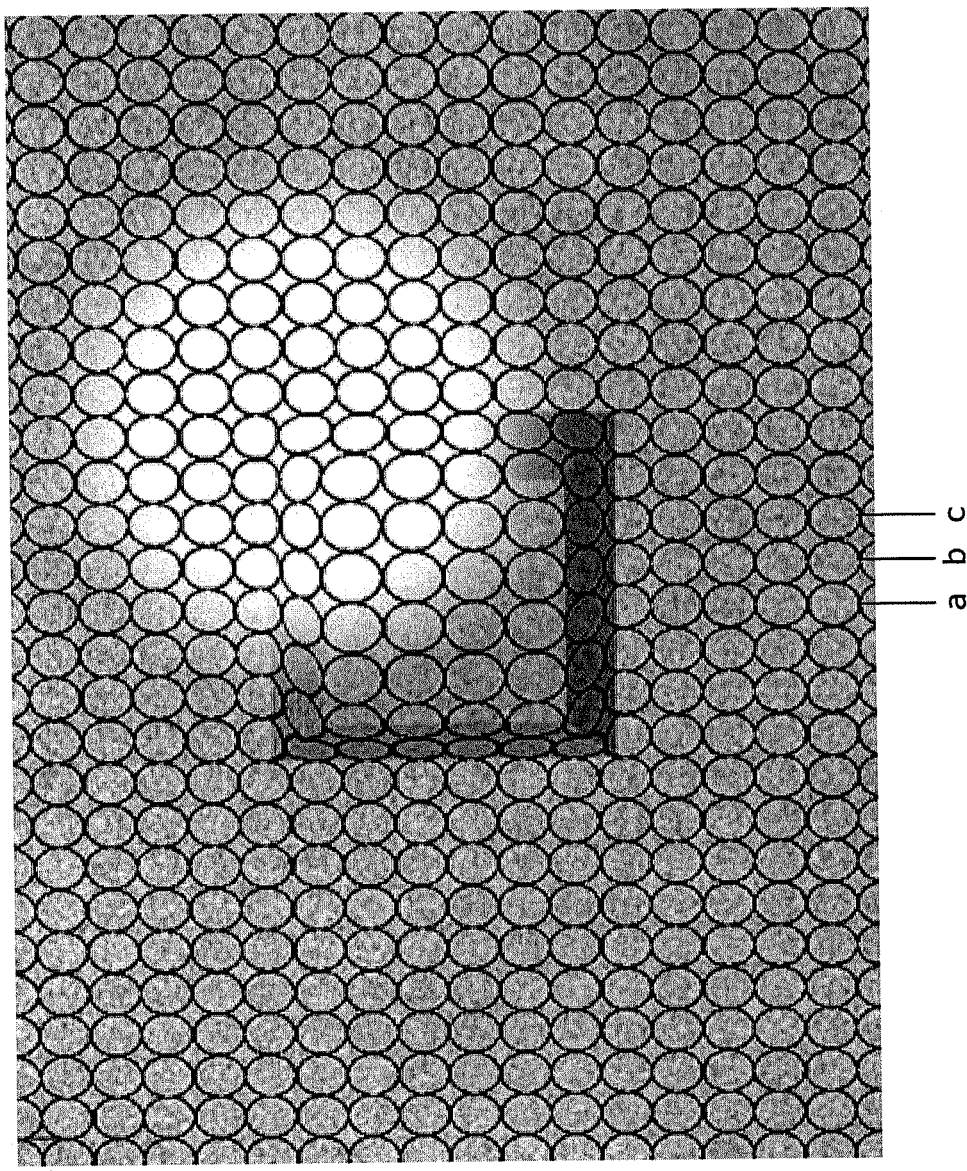
FIG. 30 is a diagram in which "a", "b", and "c" are labeled on patterns near the center of the pattern in FIG. 20.

FIG. 30 is a diagram in which "a", "b", and "c" are labeled on patterns near the center of the pattern in FIG. 20.

Figure 31:
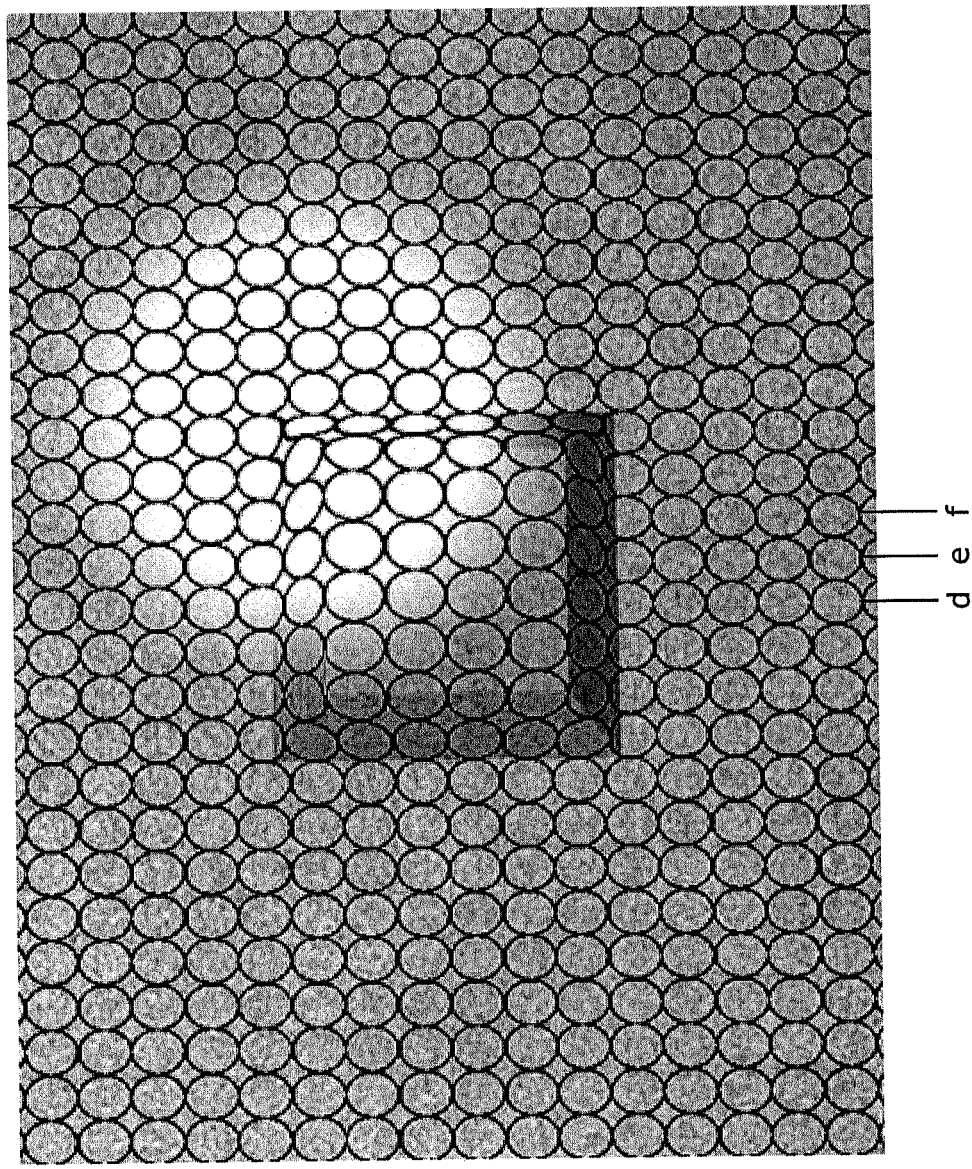
FIG. 31 is a diagram in which "d", "e", and "f" are labeled on patterns near the center of the pattern in FIG. 21.

FIG. 31 is a diagram in which "d", "e", and "f" are labeled on patterns near the center of the pattern in FIG. 21.

The pattern in the line "a" in FIG. 30 corresponds to the pattern in the line "d" in FIG. 31. Similarly, the pattern in the line "b" in FIG. 30 corresponds to the pattern in the line "e" in FIG. 31, and the pattern in the line "c" in FIG. 30 corresponds to the pattern in the line "f" in FIG. 31.

Unfortunately, in the recognition pattern, when the same pattern is repeated in the horizontal direction, a viewer sometimes perceives that the patterns that do not correspond with each other as corresponding patterns due to an illusion.

For example, it is possible for the viewer to perceive that the pattern in the line "a" corresponds to the pattern in the line "e", and the pattern in the line "b" corresponds to the pattern in the line "f".

In such a case, the horizontal direction is a direction in which a disparity is generated, and thus a viewer perceives a disparity which is different from the disparity that is supposed to be compensated due to an illusion and the stereoscopic effect cannot be compensated adequately. It should be noted that the illusion perceived by the viewer as described above varies between individuals, and thus a regular recognition pattern is not always the cause of the problem.

Therefore, in Embodiment 2, the recognition image generating unit 105 (right/left recognition image generating unit 108) uses an irregular and random recognition pattern. As an example of the irregular recognition pattern, use of an irregular recognition pattern generated from white noise is described.

Figure 32:
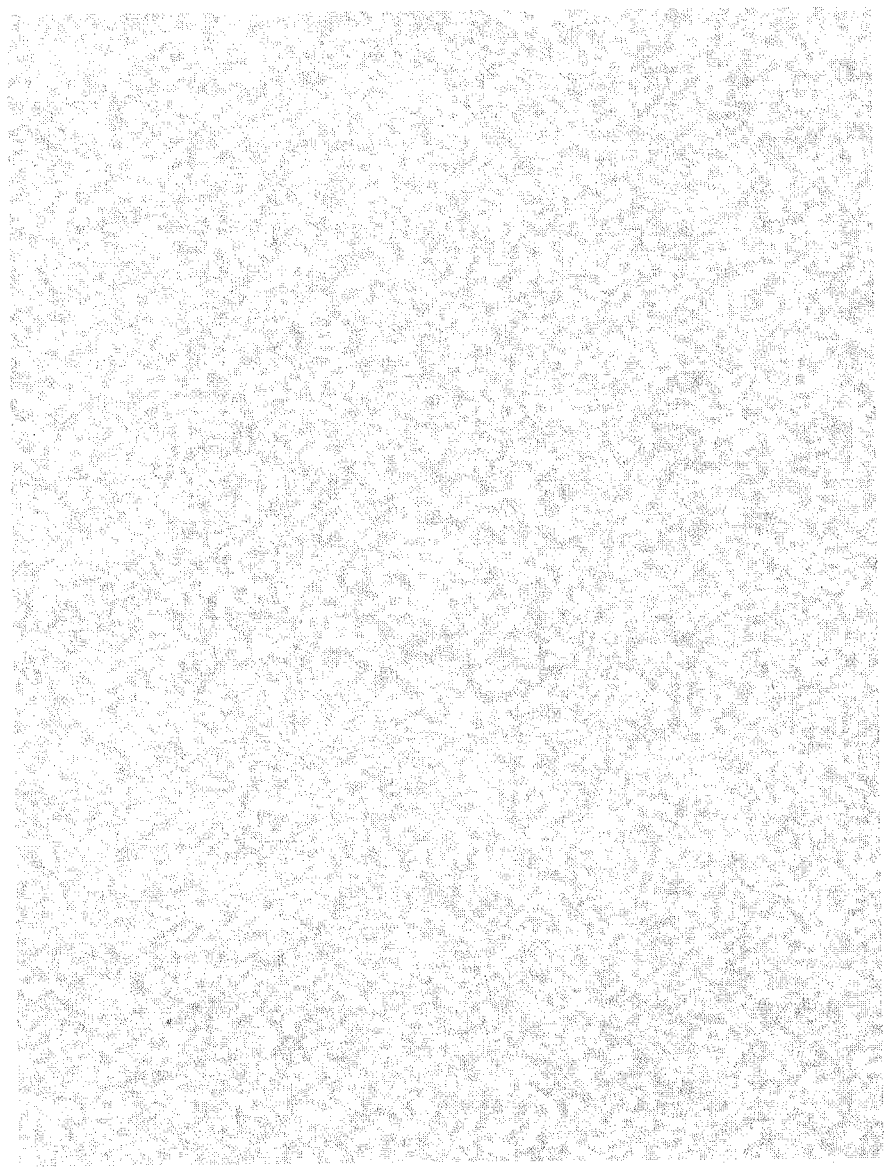
FIG. 32 illustrates a right-eye recognition image generated from the recognition pattern using white noise.

FIG. 32 illustrates a right-eye recognition image generated from a recognition pattern using white noise.

Figure 33:
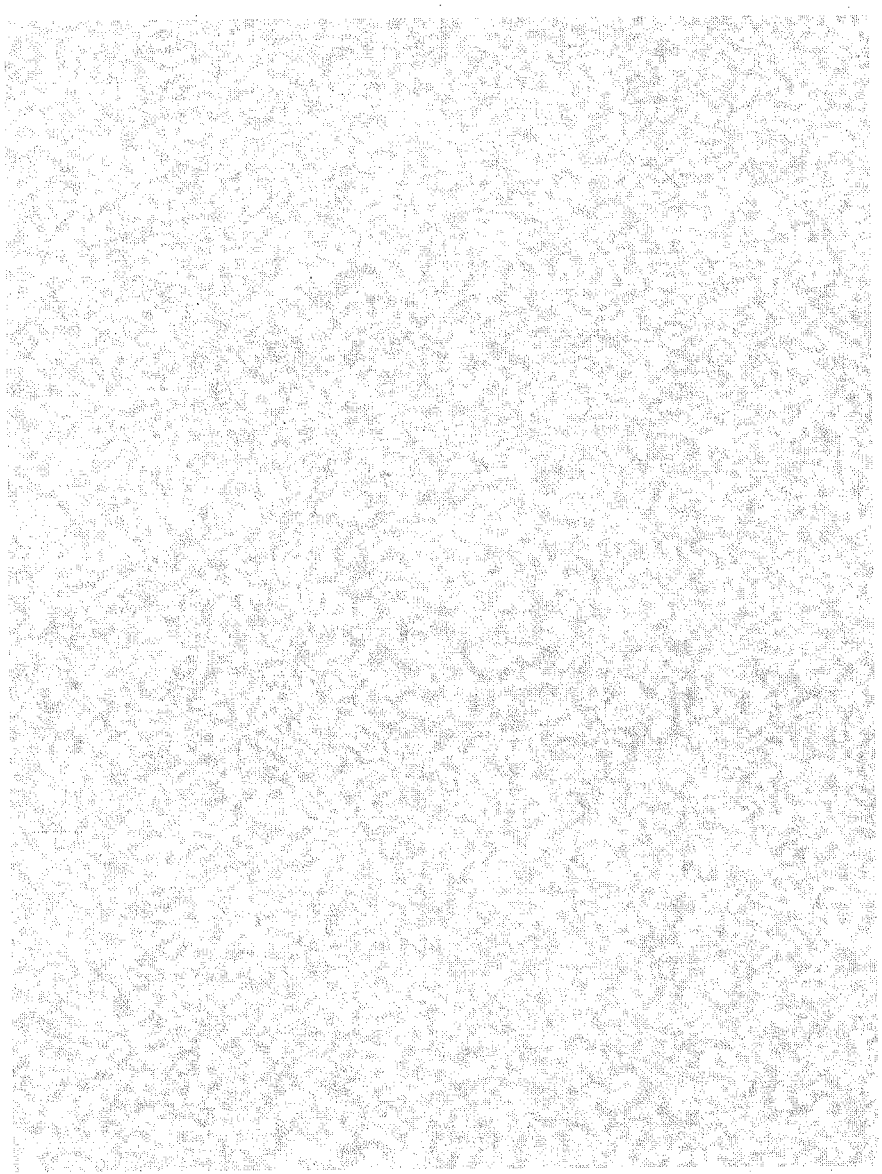
FIG. 33 illustrates a left-eye recognition image generated from the recognition pattern using white noise.

FIG. 33 illustrates a left-eye recognition image generated from the recognition pattern using white noise.

The right-eye recognition image and the left-eye recognition image can be generated by applying the irregular recognition pattern generated from white noise to the stereoscopic mesh illustrated in FIG. 8 and described in Embodiment 1. It should be noted that such an irregular recognition pattern generated from white noise is generated by randomly setting graduation of each pixel included in the recognition pattern with random numbers.

Figure 34:
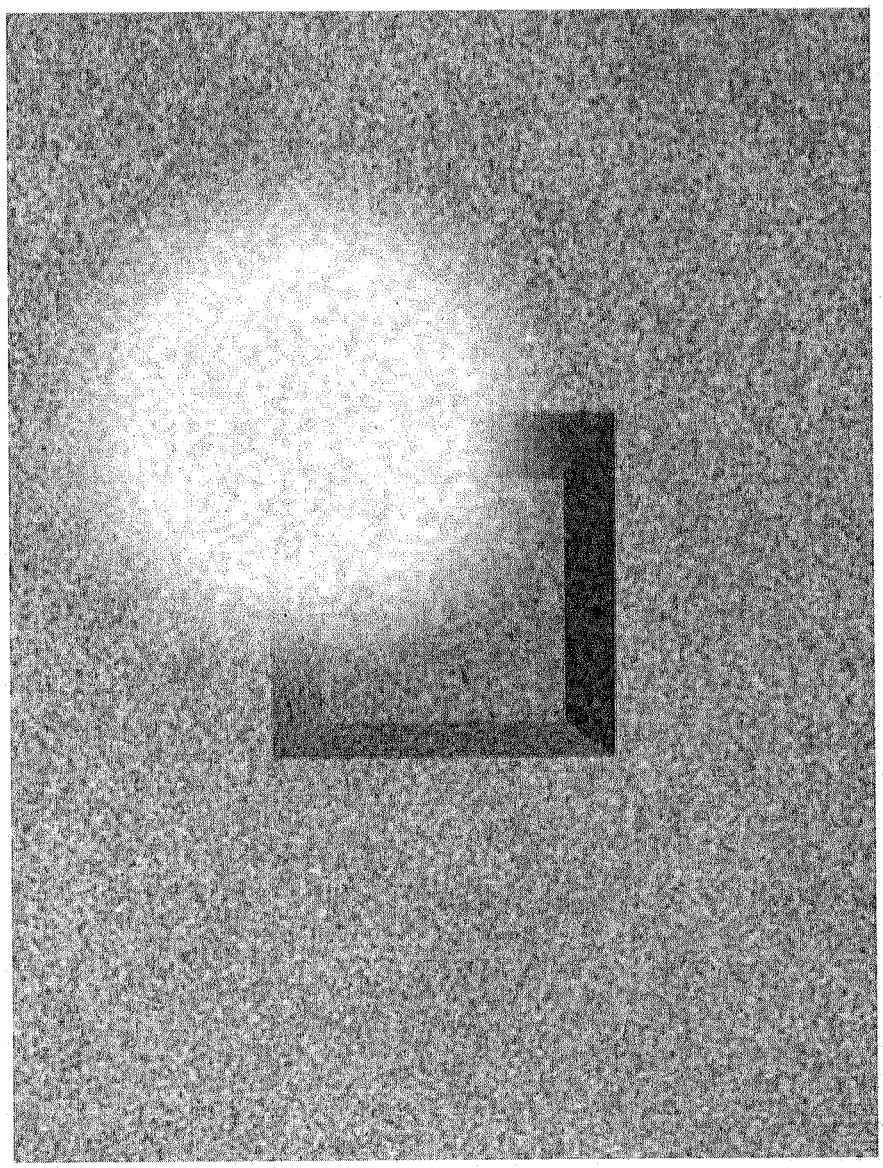
FIG. 34 illustrates an image generated by combining the right-eye recognition image in FIG. 32 with the right-eye image in FIG. 3.

FIG. 34 illustrates an image generated by combining the right-eye recognition image in FIG. 32 with the right-eye image in FIG. 3.

Figure 35:
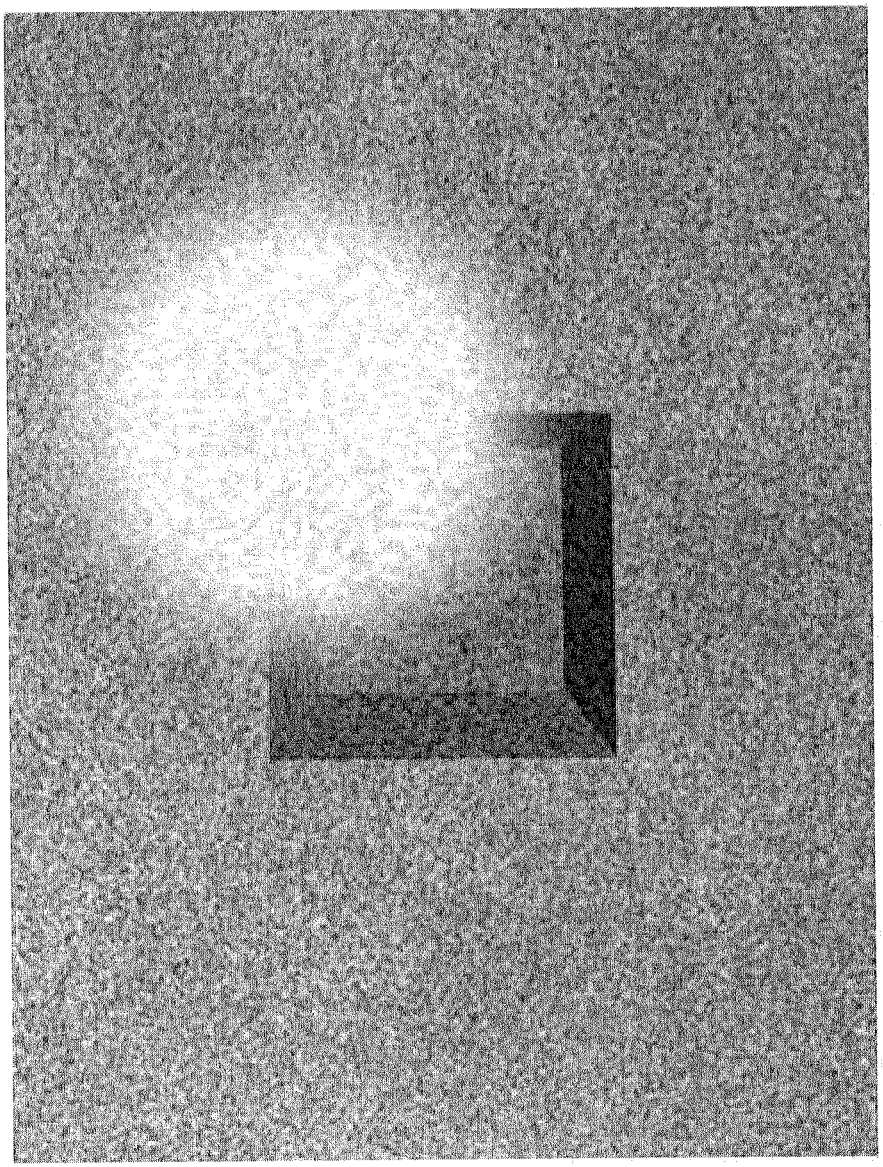
FIG. 35 illustrates an image generated by combining the left-eye recognition image in FIG. 33 with the left-eye image in FIG. 4.

FIG. 35 illustrates an image generated by combining the left-eye recognition image in FIG. 33 with the left-eye image in FIG. 4.

When the two images in FIGS. 34 and 35 are viewed stereoscopically, it can be seen that the stereoscopic effect of the square truncated pyramid is compensated. In FIGS. 34 and 35, the viewer is less likely to perceive a disparity different from the disparity that is supposed to be compensated for, compared to the case where the regular recognition pattern is used as described in Embodiment 1. In other words, the stereoscopic effect of the stereoscopic image is compensated more adequately. This is also advantageous because smaller changes are made in the atmosphere of the original right-eye and left-eye images.

As described above, in the image processing device 101 according to Embodiment 2, the recognition image generating unit 105 (right/left recognition image generating unit 108) generates a recognition image using an irregular and random pattern as a recognition pattern. This allows the image processing device 101 to adequately compensate the stereoscopic effect of the stereoscopic image without being affected by individual differences between viewers.

Embodiment 3

The image processing device 101 according to Embodiment 3 is described below. It should be noted that configurations and operations that are not described in Embodiment 3 are the same as in Embodiment 1 unless otherwise specified.

Usually, an image captured by an imaging device includes a region in which the imaging device is in focus or slightly defocused. A viewer perceives the region that is in focus in the image clearly (sharply), and perceives the region that is defocused in the image as blurred (unshapely).

However, as to the recognition image, the blur in the image due to the defocus is not added, and thus the image processing device 101 may sometimes display, in the recognition image, the region that is defocused in the Image sharply while compensating for the stereoscopic effect.

Similarly, the image captured by the imaging device may sometimes become bright and sharp in the overall image or dark and unsharp in the overall image, depending on a setting of the aperture of the imaging device. The viewer perceives a brighter region in the image more sharply, and a region that is defocused in the image as blurred (unsharp). However, brightness of the image is not considered in the recognition image, and thus when an overall image is dark and unsharp, only the recognition image combined with the image may sometimes be shown sharply.

Especially as to an image having a short depth of field, if the image processing device 101 compensates for the stereoscopic effect of the blurred portion in such an image, the image would be shown sharply and thus the atmosphere of the original image is likely to be changed.

In view of this, in Embodiment 3, the right/left recognition image generating unit 108 sets focus position information and aperture value information of each of the imaging devices that has captured the right-eye or left-eye image as viewpoint position information, in addition to the position, the orientation, and the focal length of the image capturing unit (imaging devices) that has captured the right-eye image and the left-eye image in Embodiment 1.

The focus position information indicates the focus position at the time that each of the imaging devices captures the right-eye or left-eye image. In other words, the use of the focus position information allows the right/left recognition image generating unit 108 to distinguish between a region that is in focus and a blurred region that is defocused in the right-eye image and the left-eye image and to reflect the information on the right-eye recognition image and the left-eye recognition image.

Moreover, the aperture value information indicates the aperture value at the time that each of the imaging devices captures the right-eye or left-eye image. The aperture value is used to adjust the amount of light in an optical system of the imaging device (image capturing unit) at the time of capturing. For example, the aperture value is indicated by f-number that represents the size of the aperture with respect to the size of the lens of the imaging device. With this, the right/left recognition image generating unit 108 can set brightness of the right-eye and left-eye recognition images according to the brightness of the right-eye and left-eye images.

As described above, as for the viewpoint position information, the focus position information and aperture value information of each the imaging devices that has captured the right-eye or left-eye image are additionally used in Embodiment 3.

With this, the blur in the original right-eye image and left-eye image can be added in the same manner to the right-eye recognition image and the left-eye recognition image, respectively. Therefore, the image processing device 101 can compensate a stereoscopic effect more naturally without changing the atmosphere of the original image.

Embodiment 4

The image processing device 101 according to Embodiment 4 is described below. It should be noted that configurations and operations that are not described in Embodiment 4 are the same as in Embodiment 1 unless otherwise specified.

In Embodiments 1, 2, and 3, when the image combining unit combines the image with the recognition image, the depth of the image and that of the recognition image may be sometimes misaligned. This may happen, for example, when there is an error in the depth information. In such a case, only the recognition image may be seen as if it floats from the image or the outline of the subject in the image may be seen double.

Therefore, the right-eye and left-eye images that are obtained by the obtaining unit 104 may be input to the stereoscopic mesh generating unit 106 and the right/left recognition image generating unit 108. This allows the image processing device 101 to compensate for the stereoscopic effect of the stereoscopic image even more accurately.

Figure 36:
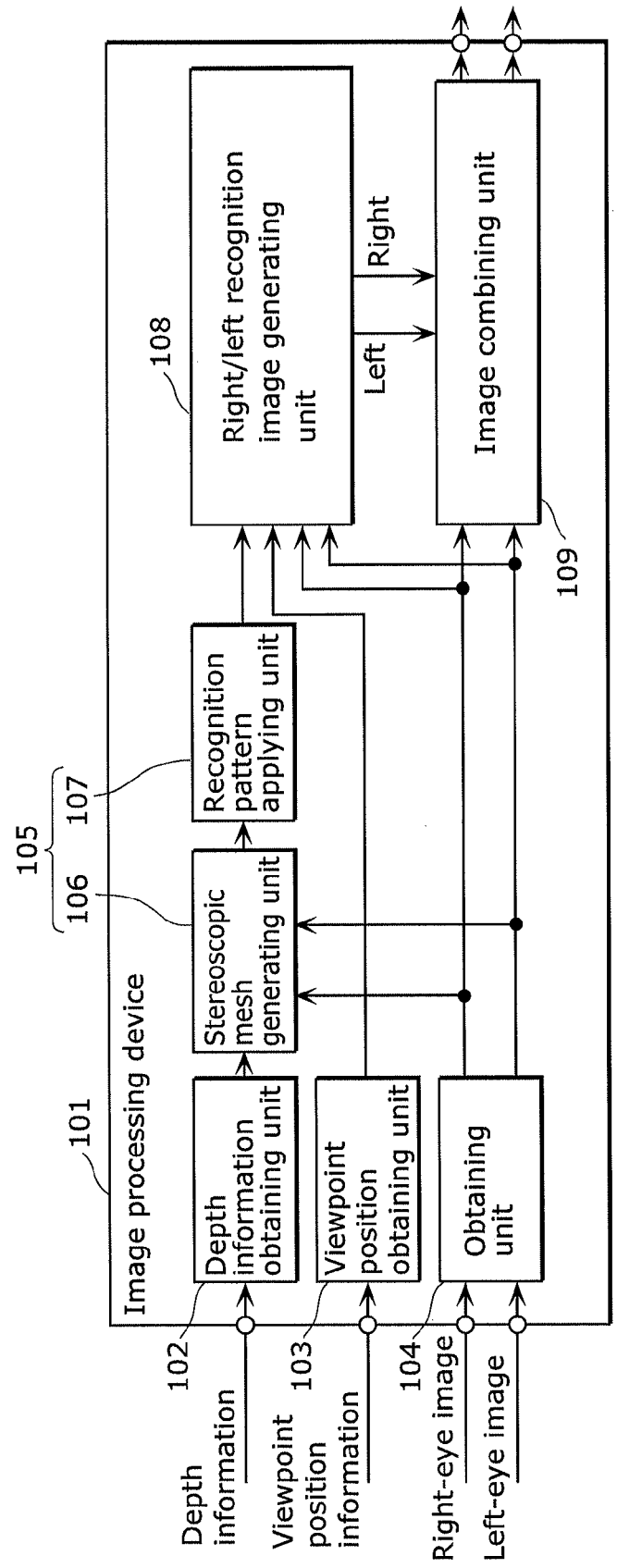
FIG. 36 is a block diagram of an image processing device according to Embodiment 4.

FIG. 36 is a block diagram of the image processing device 101 according to Embodiment 4.

First, a process of the stereoscopic mesh generating unit 106 generating an accurate stereoscopic mesh using the right-eye and left-eye images is described.

The stereoscopic mesh generating unit 106 adjusts each vertex of the stereoscopic mesh to match the subject of the right-eye and left-eye images which are input thereto. Specifically, first, the stereoscopic generating unit 106 extracts edge portions of the subject in the images by applying a hypass filter to each of the input right-eye image and left-eye image. The hypass filter to be used is, for example, a Laplacian filter. The Laplacian filter extracts an edge portion in which the variation of the luminance of each pixel in the image is extremely large, that is, extracts a high frequency region in the image.

Next, the stereoscopic mesh generating unit 106 compares the edge portions in the image and the edge portions defined by the vertices in the stereoscopic mesh. If there is a difference between the edges, the vertices in the stereoscopic mesh are adjusted to reduce the difference.

When there are not so many vertices in the stereoscopic mesh and accurate adjustment is difficult, the stereoscopic mesh generating unit 106 divides the corresponding portion in the stereoscopic mesh to create more vertices. Subsequently, the stereoscopic mesh generating unit 106 uses the created vertices to adjust the vertices in the stereoscopic mesh again.

After the adjustment is completed, the recognition pattern applying unit 107 applies the recognition pattern to the adjusted stereoscopic mesh. The right/left recognition image generating unit 108 generates a right-eye recognition image and a left-eye recognition image and outputs them to the image combining unit 109. The right/left recognition image generating unit 108 generates the right-eye recognition image and the left-eye recognition image from the recognition pattern (recognition image) applied to the stereoscopic mesh.

This process reduces errors between the image and the stereoscopic mesh, and thus allows the image combining unit 109 to combine images even more accurately.

Next, described is a process of the right/left recognition image generating unit 108 generating accurate right-eye and left-eye recognition images using the right-eye and left-eye images.

The right/left recognition image generating unit 108 adjusts viewpoint information using the right-eye and left-eye images which are input thereto.

Specifically, first, the right/left recognition image generating unit 108 applies a hypass filter to the input right-eye and left-eye images and extracts the edge portions of the subject in the images.

The right/left recognition image generating unit 108 applies the hypass filter to each of the generated right-eye and left-eye recognition images. Then, the right/left recognition image generating unit 108 compares the edge portions of the right-eye image and the edge portions of the right-eye recognition image, and adjusts the right-eye recognition image to minimize the difference between the edge portions. Specifically, the position and orientation of the virtual image capturing unit is adjusted, which has captured the recognition pattern attached to the stereoscopic mesh described in Embodiment 1. Similarly, the right/left recognition image generating unit 108 compares the edge portions of the left-eye image and the edge portions of the left-eye recognition image, and adjusts the left-eye recognition image to minimize the difference between the edge portions.

When the adjustment is completed, the right/left recognition image generating unit 108 generates the adjusted right-eye recognition image and the adjusted left-eye recognition image and outputs them to the image combining unit 109.

This reduces errors between the image and the recognition image, and allows the image combining unit 109 to combine images more accurately.

It should be noted that, in Embodiment 4, by detecting the edge portions in the images, the stereoscopic mesh generating unit 106 adjusts the stereoscopic mesh to conform to the right-eye image and the left-eye image, and the right/left recognition image generating unit 108 adjusts the left-eye recognition image and right-eye recognition image to conform to the left-eye image and the right-eye image, respectively. However, the method of conforming the stereoscopic mesh to the left-eye and right-eye recognition images and conforming the left-eye and right-eye recognition images to the right-eye and left-eye images, respectively, is not limited to the method of detecting edge portions of the images. Any method may be used, provided that amounts of characteristics are detected in the left-eye image and the right-eye image, and adjustments are made to the stereoscopic mesh, the left-eye recognition image, and the right-eye recognition image to correspond to the detected amount of characteristics.

Modifications

It goes without saying that the present invention is not limited to the above embodiments. The following are also included in the present invention.

(1) Specifically, each device described above may be achieved by a computer system which includes a microprocessor, a ROM, a RAM, a hard disk unit, a display unit, a keyboard, a mouse, and the like. A computer program is stored in the RAM or the hard disk unit. The operation of the microprocessor in accordance with the computer program allows each device to achieve its functionality. Here, the computer program includes a combination of instruction codes indicating instructions to a computer in order to achieve given functionality.

(2) Some or all of structural elements included in each device described above may include a single system large scale integration (LSI: large scale integrated circuit). The system LSI is a super multi-function LSI manufactured by integrating multiple components into one chip, and is specifically a computer system configured so as to include a microprocessor, a ROM, a RAM, and so on. A computer program is stored in the ROM. The system LSI accomplishes its functions by the microprocessor loading the computer program from the ROM to the RAM and performing operations such as computing in accordance with the loaded computer program.

(3) Some or all of structural elements included in each device described above may include an IC card or a single module which is detachable to the device. The IC card or the module is a computer system which includes a microprocessor, a ROM, a RAM, and the like. The above super-multifunctional LSI may be included in the IC card or the module. The operation of the microprocessor in accordance with the computer program allows the IC card or the module accomplishes to achieve its functionality. This IC card or module may have tamper resistant properties.

(4) The present invention may be achieved by the methods described above. In addition, these methods may be achieved by a computer program implemented by a computer, or may be implemented by a digital signal which includes a computer program.

The present invention may be achieved by a computer program or a digital signal stored in a computer-readable recording medium such as a flexible disk, a hard disk, CD-ROM, MO, DVD, DVD-ROM, DVD-RAM, a Blue-Ray® disc (BD), and a semiconductor memory. Alternatively, the present invention may be achieved by a digital signal stored in such a recording medium.

With the present invention, the computer program or the digital signal may be transmitted via, for instance, data broadcasting or a network typified by electric telecommunication lines, wireless or wired communication lines, and the Internet.

The present invention may be a computer system which includes a microprocessor and a memory, the memory may have stored therein a computer program, and the microprocessor may operate in accordance with the computer program.

Another independent computer system may implement a program or a digital signal transported being stored in a recording medium, or a program or a digital signal transported via a network or the like.

(5) The above embodiments and the above modifications may be combined.

In the foregoing, embodiments of the image processing device according to one or more aspects of the present invention and modifications thereof are described.

The image processing device 101 according to an aspect of the present invention generates a recognition image in which depth information of the stereoscopic image is patterned, by applying a recognition pattern having a regular pattern to a stereoscopic mesh representing the depth information in the first place. Subsequently, a left-eye recognition image corresponding to the left-eye image and a right-eye recognition image corresponding to the right-eye image are generated, and the corresponding images are combined. Accordingly, difference is generated between the left-eye image and the right-eye image.

With this, a viewer can clearly recognize the disparity between the left-eye and right-eye images and thus the stereoscopic effect of the stereoscopic image can be compensated.

Figure 37:
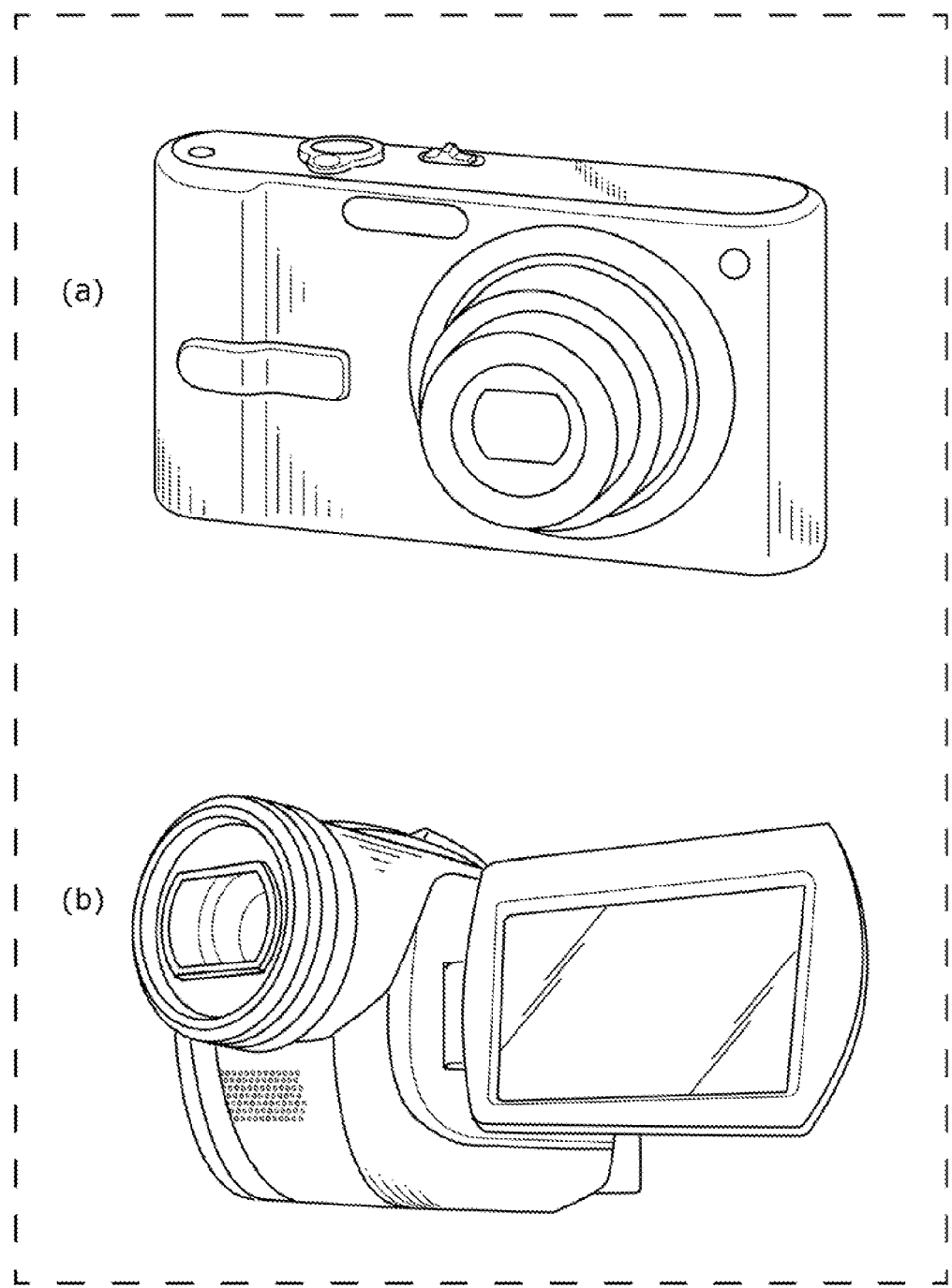
FIG. 37 illustrates an example of applications of the image processing device according to an aspect of the present invention.

The image processing device 101 according to an aspect of the present invention may be implemented, for example, as a digital still camera (DSC) illustrated in (a) in FIG. 37 and a digital video camera illustrated in (b) in FIG. 37.

Figure 38:
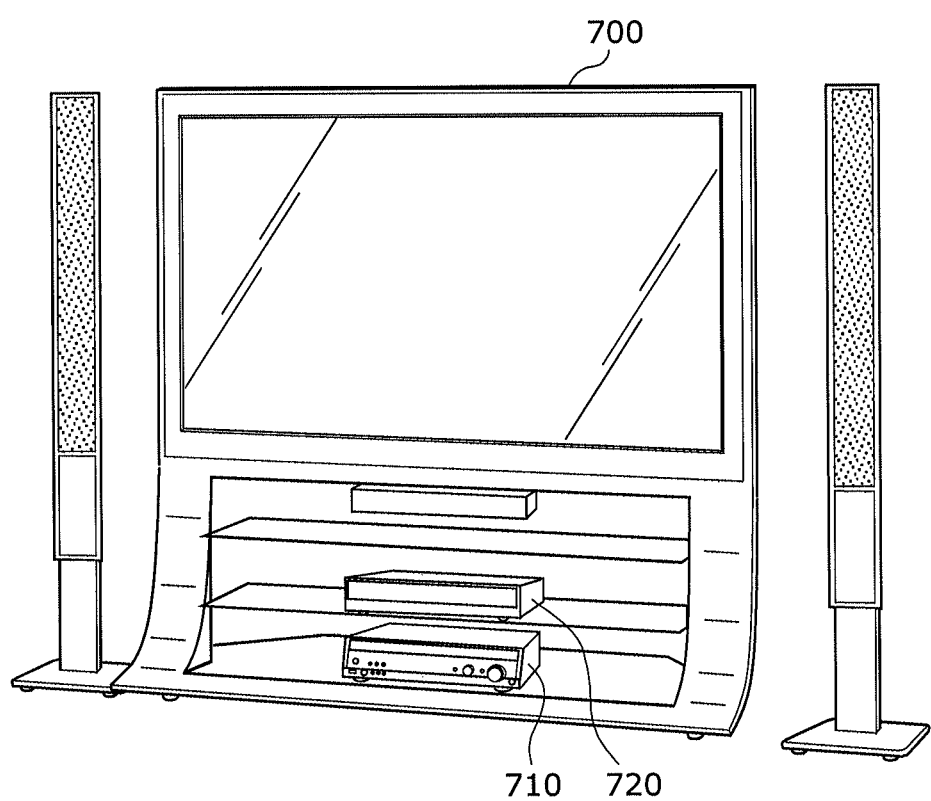
FIG. 38 is another example of application of the image processing device according to an aspect of the present invention.
Figure 39:
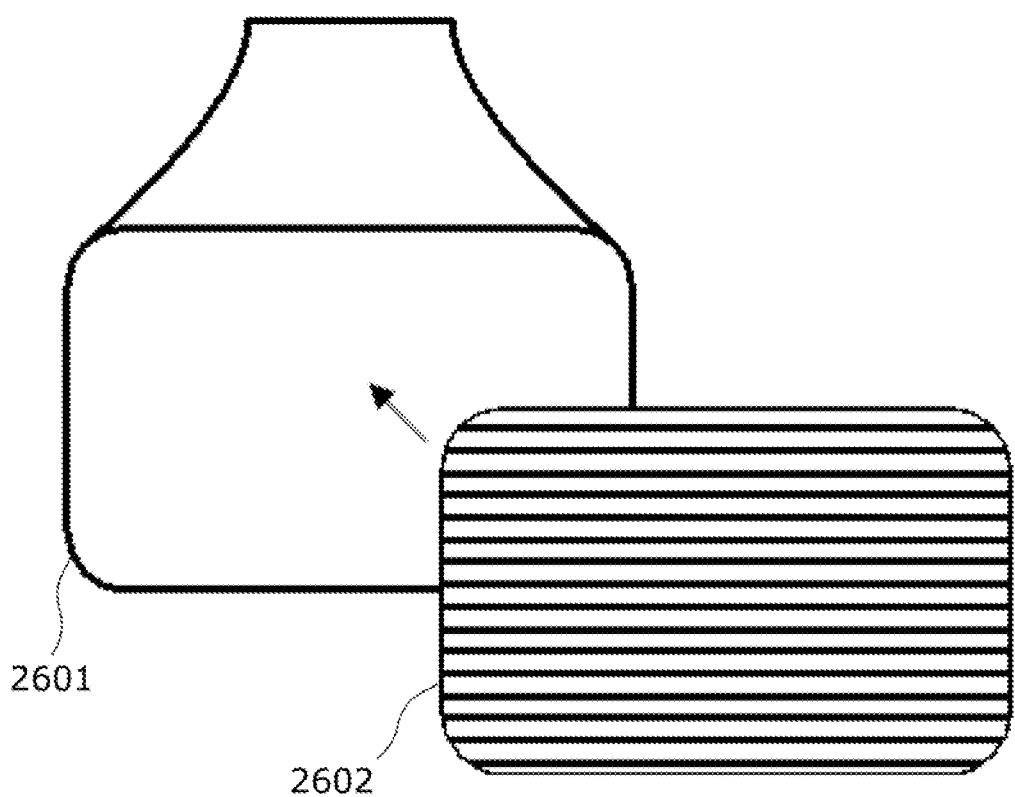
FIG. 39 illustrates a perspective view of a configuration of a conventional stereoscopic image display device.
Figure 40:
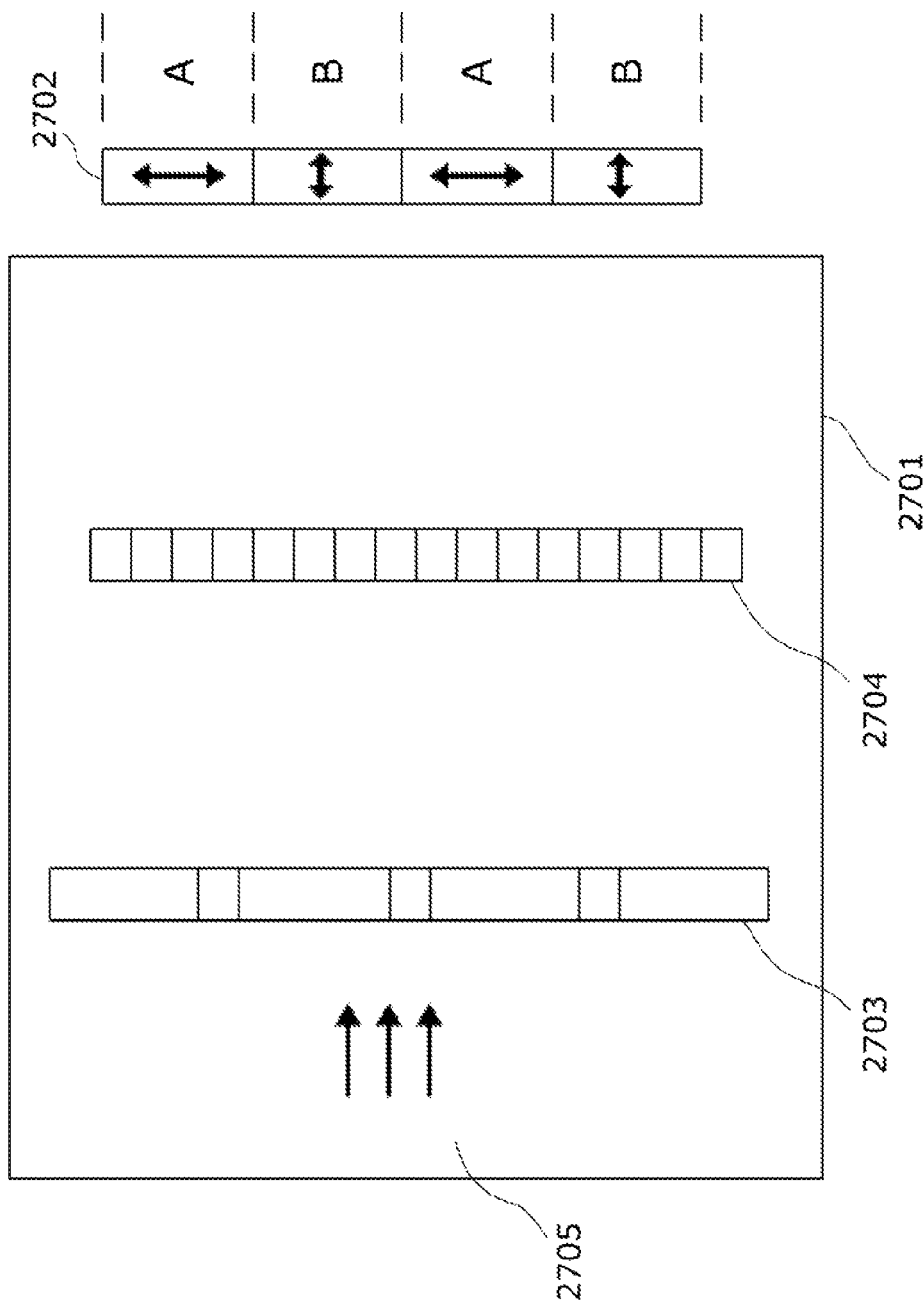
FIG. 40 is an enlarged partially cut-out view that schematically illustrates a screen portion of the image receiving tube.

As another example, the image processing device 101 according to an aspect of the present invention may be implemented as a television set 700 illustrated in FIG. 38. In this case, the obtaining unit 104 obtains images from a television broadcast, a Blu-ray® player 710, or a set-top box 720 illustrated in FIG. 38.

Moreover, the image processing device 101 may be implemented as the Blu-ray® player 710. In this case, the obtaining unit 104 obtains images from a Blu-ray® disc inserted thereto. It should be noted that the source of obtaining images is not limited to Blu-ray® discs. The obtaining unit 104 may obtain images from any recording medium, such as a DVD and a hard disc drive (HDD), and so on.

Moreover, the image processing device 101 may be implemented as the set-top box 720. In this case, the obtaining unit 104 obtains images from cable television broadcasting or the like.

Each of the structural elements in each of the embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image processing device or the like according to each of the embodiments is a program described below.

In other words, the program causes a computer to execute an image processing method of compensating for a stereoscopic effect of a stereoscopic image, the image processing method including: obtaining a left-eye image and a right-eye image which are included in the stereoscopic image; generating a recognition image corresponding to the stereoscopic image by applying a pattern to a virtual stereoscopic structure that is generated based on a depth represented in the stereoscopic image; generating a left recognition image and a right recognition image from the recognition image according to a disparity in the stereoscopic image; and combining the right-eye recognition image with the right-eye image obtained in the obtaining and combining the left-eye recognition image with the left-eye image obtained in the obtaining.

It should be noted that the present invention is not limited to these embodiments or modifications thereof. Various modifications to the embodiments that may be conceived by those skilled in the art and combinations of structural elements in different embodiments may be included within the scope of one or more aspects of the present invention, without departing from the spirit of the present invention.

The image processing device according to the present invention is capable of compensating for a stereoscopic effect that has lost in an image and useful as a digital camera, a television receiver, an image editor, a game machine, a stereoscopic image generator, or a CAD or the like.

REFERENCE SIGNS LIST

101 Image processing device
102 Depth information obtaining unit
103 Viewpoint position obtaining unit
104 Obtaining unit
105 Recognition image generating unit
106 Stereoscopic mesh generating unit
107 Recognition pattern applying unit
108 Right/left recognition image generating unit
109 Image combining unit
700 Television set
710 Blu-ray® player
720 Set-top box
2601 Image receiving tube
2602 Polarization plate
2701 Image receiving tube
2702 Polarization plate
2703 Shadow mask
2704 Fluorescent substance
2705 Electron beam
2801 Left-eye image
2802 Right-eye image

The invention claimed is:

1. An image processing device which compensates for a stereoscopic effect of a stereoscopic image, the image processing device comprising:
    an obtaining unit configured to obtain a left-eye image and a right-eye image which are included in the stereoscopic image;
    a recognition image generating unit configured to generate a recognition image corresponding to the stereoscopic image by applying a pattern to a virtual stereoscopic structure which is generated based on a depth represented in the stereoscopic image, the recognition image being an image which reflects, on the pattern, the depth represented in the stereoscopic image;
    a right/left recognition image generating unit configured to generate, from the recognition image, a right-eye recognition image and a left-eye recognition image according to a disparity in the stereoscopic image, the right-eye and left-eye recognition images allowing the recognition image to be viewed stereoscopically; and
    an image combining unit configured to combine the right-eye recognition image with the right-eye image obtained by the obtaining unit and combine the left-eye recognition image with the left-eye image obtained by the obtaining unit.

2. The image processing device according to claim 1, further comprising
    a detecting unit configured to detect, in the right-eye image and in the left-eye image, a target region in which the stereoscopic effect needs compensation,
    wherein when the target region is detected, the image combining unit is configured to combine the right-eye recognition image with the right-eye image and combine the left-eye recognition image with the left-eye image.

3. The image processing device according to claim 2,
    wherein when the detecting unit detects the target region, the image combining unit is configured to combine a region in the right-eye recognition image with the target region in the right-eye image, and combine a region in the left-eye recognition image with the target region in the left-eye image, the region in each of the right-eye and left-eye recognition images correspond to the target region.

4. The image processing device according to claim 2,
    wherein the detecting unit is configured to detect, in the right-eye image and the left-eye image, a region having a luminance value less than a predetermined threshold value or a region having a luminance value more than the predetermined threshold value as the target region.

5. The image processing device according to claim 2,
    wherein the detecting unit is configured to detect, in the right-eye image and in the left-eye image, a region having a contrast value less than a predetermined value as the target region.

6. The image processing device according to claim 1,
    wherein the pattern is an irregular pattern.

7. The image processing device according to claim 1,
    wherein the pattern is a regular pattern.

8. The image processing device according to claim 1, further comprising
a viewpoint position obtaining unit configured to obtain viewpoint position information indicating a position at which each of the left-eye image and the right-eye image is captured,
wherein the right/left recognition image generating unit is configured to generate the right-eye recognition image and the left-eye recognition image from the recognition image according to the disparity in the stereoscopic image based on the viewpoint position information.

9. The image processing device according to claim 1,
wherein the viewpoint position information includes (i) focus position information indicating a focus position of an image capturing unit at the time that each of the left-eye image and the right-eye image is captured or (ii) aperture value information indicating an aperture value of the image capturing unit at the time that each of the left-eye image and the right-eye image is captured.

10. The image processing device according to claim 1, further comprising
a depth information obtaining unit configured to obtain depth information indicating the depth in the stereoscopic image,
wherein the recognition image generating unit is configured to generate the recognition image based on the depth information.

11. The image processing device according to claim 1,
wherein the recognition image generating unit is configured to calculate depth information indicating the depth in the stereoscopic image from the right-eye image and the left-eye image that are obtained by the obtaining unit, and generate the recognition image based on the depth information.

12. An image processing method of compensating for a stereoscopic effect of a stereoscopic image, the image processing method comprising:
obtaining a left-eye image and a right-eye image which are included in the stereoscopic image;
generating a recognition image corresponding to the stereoscopic image by applying a pattern to a virtual stereoscopic structure that is generated based on a depth represented in the stereoscopic image, the recognition image being an image which reflects, on the pattern, the depth represented in the stereoscopic image;
generating a left recognition image and a right recognition image from the recognition image according to a disparity in the stereoscopic image; and
combining the right-eye recognition image with the right-eye image obtained in the obtaining and combining the left-eye recognition image with the left-eye image obtained in the obtaining.

* * * * *